United States Patent
Baek et al.

(10) Patent No.: US 9,973,620 B2
(45) Date of Patent: May 15, 2018

(54) TERMINAL AND OPERATING METHOD THEREOF

(71) Applicant: LG ELECTRONICS INC., Seoul (KR)

(72) Inventors: Bumhyeon Baek, Seoul (KR); Sangyun Lee, Seoul (KR); Yongpyo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 14/793,602

(22) Filed: Jul. 7, 2015

(65) Prior Publication Data

US 2016/0205237 A1 Jul. 14, 2016

(30) Foreign Application Priority Data

Jan. 8, 2015 (KR) .......................... 10-2015-0002968

(51) Int. Cl.
*H04M 1/725* (2006.01)
*H04B 1/3888* (2015.01)
*H04M 1/02* (2006.01)

(52) U.S. Cl.
CPC ...... *H04M 1/72575* (2013.01); *H04B 1/3888* (2013.01); *H04M 1/0245* (2013.01); *H04M 1/72527* (2013.01); *H04M 1/0214* (2013.01); *H04M 2250/12* (2013.01)

(58) Field of Classification Search
USPC ........................................... 455/575.4, 575.8
See application file for complete search history.

(56) References Cited

U.S. PATENT DOCUMENTS

| 6,009,338 | A | * | 12/1999 | Iwata | .................. | H04M 1/0214 |
| | | | | | | 379/433.04 |
| 2004/0257334 | A1 | * | 12/2004 | Yajima | ................ | H04M 1/0225 |
| | | | | | | 345/156 |
| 2009/0137278 | A1 | * | 5/2009 | Haru | .................... | H04M 1/0245 |
| | | | | | | 455/566 |
| 2012/0066865 | A1 | * | 3/2012 | Lauder | .................. | G06F 1/1626 |
| | | | | | | 16/382 |
| 2012/0068919 | A1 | * | 3/2012 | Lauder | .................. | G06F 1/1626 |
| | | | | | | 345/156 |
| 2012/0068942 | A1 | * | 3/2012 | Lauder | ..................... | H01F 7/04 |
| | | | | | | 345/173 |

(Continued)

FOREIGN PATENT DOCUMENTS

| KR | 20-0470477 | 12/2013 |
| KR | 10-2014-0057462 | 5/2014 |
| KR | 10-2014-0142935 | 12/2014 |

*Primary Examiner* — Nay A Maung
*Assistant Examiner* — Erica Fleming-Hall
(74) *Attorney, Agent, or Firm* — Lee, Hong, Degerman, Kang & Waimey

(57) ABSTRACT

Provided is an operating method of a terminal coupled with a terminal case. The method includes: determining a terminal state including at least one of an operating state of the terminal and a state of the terminal case; recognizing a state change of the terminal case; and performing an operation corresponding to the determined terminal state and the recognized state change of the terminal case, wherein the state of the terminal case includes a position corresponding to the terminal of a case front part of the terminal case covering a front of the terminal.

9 Claims, 39 Drawing Sheets

(56) References Cited

U.S. PATENT DOCUMENTS

| | | | | |
|---|---|---|---|---|
| 2012/0072167 A1* | 3/2012 | Cretella, Jr. | .......... | G06F 1/1626 |
| | | | | 702/150 |
| 2013/0076614 A1* | 3/2013 | Ive | ......... | G06F 1/1677 |
| | | | | 345/156 |
| 2013/0175200 A1* | 7/2013 | Poon | ...... | F16M 13/00 |
| | | | | 206/759 |
| 2013/0301204 A1* | 11/2013 | Yim | ...... | G06F 1/1601 |
| | | | | 361/679.26 |
| 2013/0328917 A1* | 12/2013 | Zambetti | .............. | G06F 1/1626 |
| | | | | 345/620 |
| 2014/0036438 A1* | 2/2014 | Gioscia | ................. | A45C 11/00 |
| | | | | 361/679.55 |
| 2014/0043121 A1* | 2/2014 | Sartee | ....... | G06F 1/16 |
| | | | | 335/219 |
| 2014/0318994 A1* | 10/2014 | Lee | ......... | A45C 11/00 |
| | | | | 206/37 |
| 2015/0031347 A1* | 1/2015 | Kim | .................. | H04M 1/0245 |
| | | | | 455/418 |
| 2015/0062126 A1* | 3/2015 | Lee | ....... | G06T 3/0006 |
| | | | | 345/428 |
| 2015/0065208 A1* | 3/2015 | Balaji | ..................... | H04M 1/04 |
| | | | | 455/575.8 |
| 2015/0133183 A1* | 5/2015 | Alameh | ........... | H04M 1/72575 |
| | | | | 455/550.1 |
| 2016/0026381 A1* | 1/2016 | Kim | .................. | G06F 3/04817 |
| | | | | 715/761 |
| 2016/0109936 A1* | 4/2016 | Lee | .......... | G06F 3/002 |
| | | | | 345/156 |
| 2016/0255256 A1* | 9/2016 | Oh | ....... | H04N 5/2254 |
| | | | | 348/376 |
| 2017/0180838 A1* | 6/2017 | Hemesath | .............. | H04R 1/026 |

* cited by examiner

TERMINAL AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0002968, filed on Jan. 8, 2015, the contents of which are hereby incorporated by reference herein in its entirety.

BACKGROUND

The present disclosure relates to a terminal and an operating method thereof, and particularly, to a terminal configured to perform an operation according to a case state of a case coupled with the terminal.

Depending on whether terminals are movable, the terminals are divided into mobile/portable terminals and stationary terminals. Again, the terminals may be divided into handheld terminals and vehicle mounted terminals depending on whether users can carry the terminals personally.

As functions of a terminal are diversified, such a terminal may be implemented in a form of a multimedia player having multi-functions, for example, photo or video capturing, playback of music or video files, game plays, and broadcast reception. Then, as terminals are implemented in multimedia device forms, they may become equipped with larger displays than before. Then, since the display of a terminal includes a thin, high-resolution touch panel, it is an expensive component that occupies a greater percentage of a terminal price.

Moreover, as the display of a terminal becomes larger, the terminal is damaged often due to drop or impact to the terminal.

Accordingly, various forms of terminal cases are coupled with terminals and used in order to protect the displays of the terminals from being damaged. Especially, terminal cases in forms that cover the terminal fronts with the case fronts may be used in order to protect the displays of terminals.

However, when a terminal case having the case front that covers the terminal front is used, a user needs to flip the case front of the terminal case in order to use the terminal.

Accordingly, recently, in order to resolve inconvenience of using a terminal that is coupled with a terminal case use, a terminal supports an operation for turning on its display based on a position of a terminal case. Further, a user may check a partial screen of a terminal through a window equipped at the case front of a terminal case.

However, such functions support only some operations of a terminal so that they cannot provide various operations performed by the terminal. In general, in order to perform an operation by a user who uses a terminal coupled with a terminal case, the user needs to flip the case front of the terminal case and go through several input steps.

Accordingly, it is necessary to provide a terminal that can perform various operations based on a state of a terminal case that is coupled with the terminal without requiring additional user inputs.

SUMMARY

Embodiments provide a terminal for recognizing a state of a terminal case coupled with the terminal and performing various operations corresponding to the recognized case state.

In one embodiment, provided is an operating method performed at a terminal coupled with a terminal case. The method includes: determining an operating state of the terminal; recognizing a change of a state of the case with respect to the terminal; and performing an operation based on the determined operating state and the recognized change of the state of the case, wherein the state of the case includes a first case state in which a case front part of the case covers a front portion of the terminal or the case front part is in contact with the front portion of the terminal.

In another embodiment, a terminal coupled with a terminal case includes: a display; a sensing unit configured to sense a position of the case with respect to the terminal; and a control unit configured to: determine an operating state of the terminal; recognize a change of a state of the case based on the sensed position of the case; and perform an operation based on the determined operating state and the recognized change of the state of the case, wherein the state of the case includes a first case state in which a case front part of the case covers a front portion of the terminal or the case front part is in contact with the front portion of the terminal.

The details of one or more embodiments are set forth in the accompanying drawings and the description below. Other features will be apparent from the description and drawings, and from the claims.

DETAILED DESCRIPTION OF THE EMBODIMENTS

Figure 1:
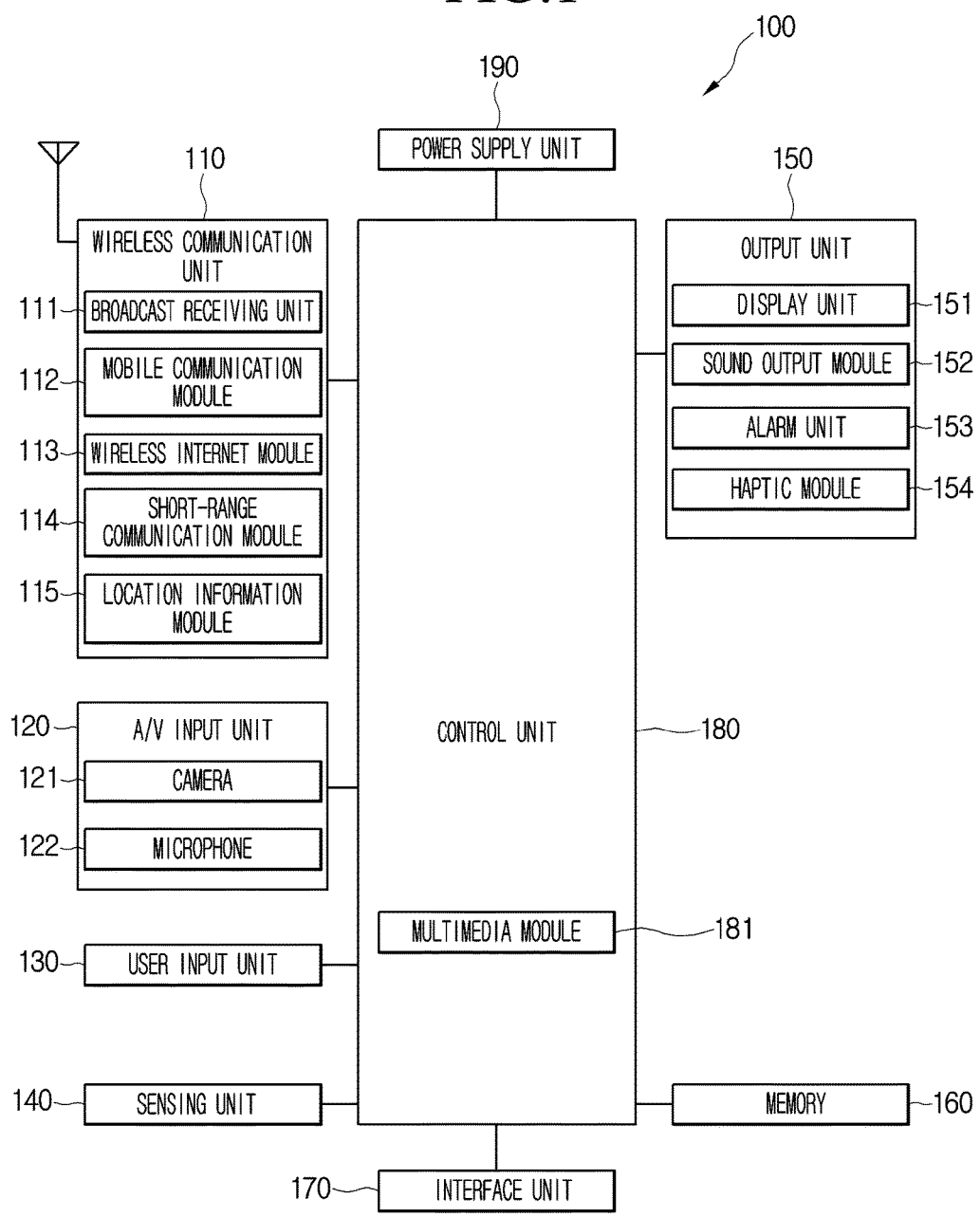
FIG. 1 is a block diagram of a terminal according to an embodiment of the present invention.

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and, do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

The terms of a singular form may include plural forms unless they have a clearly different meaning in the context.

Additionally, in this specification, the meaning of "include," "comprise," "including," or "comprising," specifies a property, a region, a fixed number, a step, a process, an element and/or a component but does not exclude other properties, regions, fixed numbers, steps, processes, elements and/or components.

Terminals described in this specification may include mobile phones, smartphones, laptop computers, terminals for digital broadcast, personal digital assistants (PDAs), portable multimedia players (PMPs), navigation systems, slate PCs, tablet PCs, ultrabooks, and wearable devices (for example, smartwatchs, smart glasses, and head mounted displays (HMDs)).

However, it is apparent to those skilled in the art that configurations according to embodiments of the present invention disclosed in this specification are applicable to terminals such as digital TVs, desktop computers, and digital signage, except for the case applicable to only terminals.

Then, a structure of a terminal according to an embodiment of the present invention is described with reference to FIG. 1.

FIG. 1 is a block diagram of a terminal according to an embodiment of the present invention.

The terminal 100 may include a wireless communication unit 110, an audio/video (A/V) input unit 120, a user input unit 130, a sensing unit 140, an output unit 150, a memory 160, an interface unit 170, a control unit 180, and a power supply unit 190. Since not all components shown in FIG. 1 are essential, a terminal having more or less than the components may be implemented.

Hereinafter, the components will be examined in order.

The wireless communication unit 110 may include at least one module allowing wireless communication between the terminal 100 and a wireless communication system, between the terminal 100 and another terminal 100, or between the terminal 100 and an external server. Additionally, the wireless communication unit 110 may include at least one module connecting the terminal 100 to at least one network.

The wireless communication unit 110 may include at least one of a broadcast receiving unit 111, a mobile communication module 112, a wireless Internet module 113, a short range communication module 114, or a location information module 115.

The broadcast receiving unit 111 may receive a broadcast signal and/or broadcast related information from an external broadcast management server through a broadcast channel.

The broadcast channel may include a satellite channel and a terrestrial channel. The broadcast management server may refer to a server for generating and transmitting broadcast signals and/or broadcast related information or a server for receiving pre-generated broadcast signals and/or broadcast related information and transmitting them to a terminal. The broadcast signals may include TV broadcast signals, radio broadcast signals, and data broadcast signals and also may include broadcast signals in a combination format thereof.

The broadcast related information may refer to information relating to broadcast channels, broadcast programs, or broadcast service providers. The broadcast related information may be provided through a mobile communication network. In such a case, the broadcast related information may be received by the mobile communication module 112.

The broadcast related information may exist in various formats. For example, the broadcast related information may exist in formats such as Electronic Program Guide (EPG) of Digital Multimedia Broadcasting (DMB) or Electronic Service Guide (ESG) of Digital Video Broadcast-Handheld (DVB-H).

The broadcast receiving unit 111, for example, may receive digital broadcast signals by using digital broadcast systems such as Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and Integrated Services Digital Broadcast-Terrestrial (ISDB-T). Of course, the broadcast receiving unit 111 may be configured to be compatible with other broadcast systems in addition to the digital broadcast system.

Broadcast signals and/or broadcast related information received through the broadcast receiving unit 111 may be stored in the memory 160.

The mobile communication module 112 may transmit/receive wireless signals to/from at least one of base stations, external terminals, and servers. The wireless signals may include various types of data according to a voice call signal, a video call signal, or text/multimedia message transmission.

The wireless Internet module 113 refers to a module for wireless Internet access and may be built in or external to the terminal 100. Wireless Internet techniques may include Wireless LAN (WLAN) such as Wi-Fi, Wireless broadband (Wibro), World Interoperability for Microwave Access (Wimax), and High Speed Downlink Packet Access (HSDPA).

The short range communication module 114 may refer to a module for short range communication. Short range communication techniques may include Bluetooth, Radio Frequency Identification (RFID), infrared Data Association (IrDA), Ultra Wideband (UWB), ZigBee, and Near Field Communication (NFC).

The location information module 115 is a module for obtaining the location (or the current location) of a terminal and its representative examples include a global positioning system (GPS) module or a Wi-Fi module. For example, a terminal may obtain its position through the GPS module by using a signal transmitted from a GPS satellite. As another example, a terminal may obtain its position through a Wi-Fi module on the basis of information of a wireless access point (AP) transmitting/receiving a wireless signal to/from the Wi-Fi module. If necessary, the position information module 115 may perform a function of another module in the wireless communication unit 110 in order to obtain data on the location of a terminal substitutionally or additionally. The location information module 115 is a module for obtaining the position (or the current position) of a terminal and is not limited to a module directly calculating and obtaining the position of a terminal.

Referring to FIG. 1, the A/V input unit 120 may be for audio signal or video signal input and may include a camera 121 and a microphone 122. The camera 121 processes image frames such as a still image or a video obtained by an image sensor in a video call mode or a capturing mode. The processed image frame may be displayed on the display unit 151.

The image frame processed by the camera 121 may be stored in the memory 160 or transmitted to the outside through the wireless communication unit 110. The camera 121 may be provided with two or more according to a usage environment.

The microphone 122 may receive external sound signals through a microphone in a call mode, a recording mode, and a voice recognition mode and process them as electrical sound data. In the case of a call mode, the processed voice data may be converted into a format transmittable to a mobile communication base station through the mobile communication module 112 and outputted. Various noise canceling algorithms for removing noise occurring during the reception of external sound signals may be implemented in the microphone 122.

The A/V input unit 120 may include a camera 121 or an image input unit for image signal input and a microphone 122 or an audio input unit for audio signal input. Voice data or image data collected by the A/V input unit 120 are analyzed and processed as a user's control command.

The user input unit 130 (for example, a touch key and a mechanical key)) is for receiving information from a user.

The sensing unit 140 may include at least one sensor for sensing at least one of information in a terminal, environmental information around a terminal, or user information. For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone 122, a battery gauge, an environmental sensor (for example, a barometer, a hygrometer, a thermometer, a radiation sensor, a thermal sensor, and a gas sensor), or a chemical sensor (for example, an electronic noise, a healthcare sensor, and a biometric sensor). Moreover, a terminal disclosed in this specification may combine information sensed by at least two or more sensors among such sensors.

Figure 6:
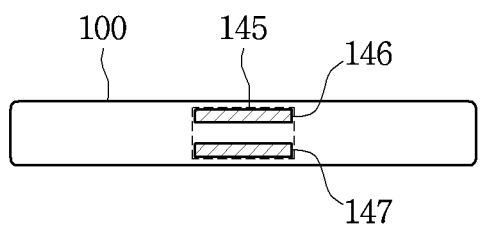
FIG. 6 is a sectional view of a terminal including a plurality of magnetic sensors according to an embodiment of the present invention.

Additionally, the sensing unit 140 may sense a state of a terminal case 200 coupled with the terminal 100. For example, a state of the terminal case 200 may be sensed through a magnetic sensor. As another example, a state of the terminal case 200 may be sensed through a front magnetic sensor 146 or a rear magnetic sensor 147 included in the sensing unit 140, as shown in FIG. 6. Herein, a state of the terminal case 200 may mean the position of a case front part 210 of the terminal case 200 coupled with the terminal 100. A state sensing of the terminal case 200 of the sensing unit 140 will be described later.

The output unit 150 may be used to generate a visual, auditory, or haptic output and may include at least one of a display unit 151, a sound output unit 152, an alarm unit 153, or a haptic module 154. The display unit 151 and a touch sensor may form a mutual layer structure or may be formed integrally, so that a touch screen may be implemented. Such a touch screen may serve as the user input unit 123 providing an input interface between the terminal 100 and a user and may provide an output interface between the terminal 100 and a user at the same time.

The display unit 151 may display (output) information processed in the terminal 100. For example, when a terminal is in a call mode, the display unit 151 may display a call related user interface (UI) or graphic user interface (GUI). When the terminal 100 is in a video call mode or a capture mode, the display unit 151 may display a captured and/or received image, UI, and GUI.

The display unit 151 may include at least one of a liquid crystal display (LCD), a thin film transistor-liquid crystal display (TFT LCD), an organic light-emitting diode (OLED), a flexible display, or a 3D display.

Some displays among them may be configured with a transparent type or a light transmission type to be seen through the displays. This may be referred to as a transparent display and the typical examples of the transparent display may include Transparent OLED (TOLED). The display unit 151 may be configured with a rear structure or a light transmission type structure. Through such a structure, a user may see an object located at the rear of a terminal body through an area that the display unit 151 of a terminal body occupies.

The display unit 151 may be two or more according to an implementation form of the terminal 100. For example, a plurality of display units may be disposed on one side, being spaced from each other or integrally, or may be disposed at different sides in the terminal 100.

When the display unit 151 and a sensor for detecting a touch operation (hereinafter referred to as a touch sensor) form a mutual layer structure (hereinafter referred to as a touch screen), the display unit 151 may be used as an input device in addition to an output device. A touch sensor, for example, may have a form of a touch film, a touch sheet, and a touch pad.

The touch sensor may be configured to convert changes in a pressure applied to a specific portion of the display unit 151 or a capacitance generated from a specific portion of the display unit 151 into electrical input signals. The touch sensor may be configured to detect a pressure and a capacitance during touch in addition to a touched position and area.

When there is a touch input applied on the touch sensor, signal(s) corresponding thereto may be transmitted to a touch controller. The touch controller processes the signal(s) and then transmits corresponding data to the control unit 180. Therefore, the control unit 180 may recognize which area of the display unit 151 is touched.

Additionally, the control unit 180 may determine the type of a user's touch input on the basis of an area, a pressure, and a capacitance during touch. Accordingly, the control unit 180 may distinguish a multi touch using user's finger touch, nail touch, knuckle touch, and a plurality of fingers.

The proximity sensor may be disposed in an inner area of a terminal surrounded by the touch screen or around the touch screen. The proximity sensor refers to a sensor detecting whether there is an object approaching a predetermined detection surface or whether there is an object around by using the strength of an electromagnetic field or infrared, without mechanical contact. The proximity sensor has a longer lifecycle and higher usability than a contact type sensor.

Examples of the proximity sensor may include a transmission-type photoelectric sensor, a direct reflective-type photoelectric sensor, a mirror reflective-type photoelectric sensor, a high-frequency oscillation-type proximity sensor, a capacitive-type proximity sensor, a magnetic-type proximity sensor, and an infrared proximity sensor. When the touch screen is capacitive, it is configured to detect the proximity of a pointer through changes in electric field according to the proximity of the pointer. In this case, the touch screen (or a touch sensor) may be classified as a proximity sensor.

On the other hand, the proximity sensor may include a front sensor 146 for sensing the front direction of the terminal 100 and a rear sensor 147 for sensing the rear direction of the terminal 100.

For convenience of description, an action for recognizing a pointer is disposed on the touch screen as the pointer is close on the touch screen without contacting the touch screen is called "proximity touch" and an action that the pointer actually contacts the touch screen is called "contact touch". A position that a pointer is proximity-touched on the touch screen is a position that the pointer vertically corresponds to the touch screen when the pointer is proximity-touched.

The proximity sensor may detect a proximity touch and a proximity touch pattern (for example, a proximity touch distance, a proximity touch direction, a proximity touch speed, a proximity touch time, a proximity touch position, and a proximity touch movement state). Information corresponding to the detected proximity touch operation and proximity touch pattern may be outputted on a touch screen.

The sound output module 152 may output audio data received from the wireless communication unit 110 or stored in the memory 160 in a call signal reception, a call mode, a recording mode, a voice recognition mode, or a broadcast reception mode. The sound output module 152 may output a sound signal relating to a function (for example, a call signal reception sound and a message reception sound) performed by the terminal 100. The sound output module 152 may include a receiver, a speaker, and a buzzer.

The alarm unit 153 outputs a signal for notifying an event occurrence of the terminal 100. Examples of an event occurring from a terminal may include a call signal reception, a message reception, a key signal input, and a touch input. The alarm unit 153 may output signals in another format in addition to video signals or audio signals, for example, signals for notifying an event occurrence by vibration. The video signal or audio signal may be outputted through the display unit 151 or the sound output module 152, so that they 151 and 152 may be classified as part of the alarm unit 153.

The haptic module 154 generates various haptic effects that a user can feel. A representative example of a haptic effect that the haptic module 154 generates is vibration. The intensity and pattern of a vibration generated by the haptic module 154 may be controllable. For example, the haptic module 154 may synthesize and output different vibrations or output different vibrations sequentially.

The haptic module 154 may generate various haptic effects, for example, effects by a pin arrangement moving vertical to a contact skin surface, injection power or suction power of air through an injection port or a suction port, rubbing a skin surface, electrode contact, stimulus of electrostatic force and effects by the reproduction of cold/warm sense by using a device absorbing or emitting heat.

The haptic module 154 may be implemented to deliver a haptic effect through a direct contact and also allow a user to feel a haptic effect through a muscle sense such as a finger or an arm. The haptic module 154 may be more than two according to a configuration aspect of the terminal 100.

Additionally, the haptic module 154 may include a vibration device for generating vibration. For example, at least one vibration may be included in the haptic module 154 and may have various forms such as a bar type and a coin type.

Then, the haptic module 154 may be provided at various positions according to the form of the terminal 100. For example, in the case of a watch type terminal, the haptic module 154 may be included in at least one of a body and a band of the watch type terminal.

Additionally, the memory 160 may store data supporting various functions of the terminal 100. The memory 160 may store a plurality of application programs (for example, application programs or applications) running on the terminal 100 and also data and commands for operations of the terminal 100. At least part of such an application program may be downloaded from an external server through a wireless communication. Additionally, at least part of such an application program may be included in the terminal 100 from the time of shipment in order to perform a basic function (for example, an incoming call, a transmission function, and a message reception) of the terminal 100. Moreover, an application program may be stored in the memory 160 and installed on the terminal 100, so that it may run to perform an operation (or a function) of the terminal 100 by the control unit 180.

The memory 160 may include at least one type storage medium among flash memory types, hard disk types, multimedia card micro types, card type memory types (for example, SD or XD memory types), random access memory (RAM) types, static random access memory (SRAM) types, read-only memory (ROM) types, electrically erasable programmable read-only memory (EEPROM) types, programmable read-only memory (PROM) types, magnetic memory types, magnetic disk types, and optical disk types. The terminal 100 may operate in relation to a web storage performing a storage function of the memory 160 on the Internet.

The interface unit 170 may serve as a path to all home devices connected to the terminal 100. The interface unit 170 may receive data from an external device, receive power and deliver it to each component in the terminal 100, or transmit data in the terminal 100 to an external device. For example, the interface unit 170 may include a wired/wireless headset port, an external charger port, a wired/wireless data port, a memory card port, a port connecting a device equipped with an identification module, an audio I/O port, a video I/O port, and an earphone port.

The identification module, as a chip storing various information for authenticating the usage authority of the terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through a port.

When the terminal 100 is connected to an external cradle, the interface unit 170 may become a path through which power of the cradle is supplied to the terminal 100 or a path through which various command signals inputted from the cradle are delivered to the terminal 100 by a user. The various command signals or the power inputted from the cradle may operate as a signal for recognizing that the terminal 100 is accurately mounted on the cradle.

The control unit 180 typically controls an overall operation of a terminal. For example, the control unit 180 may perform control and processing relating to voice call, data communication and video call. The control unit 180 may include a multimedia module 181 for playing multimedia. The multimedia module 181 may be implemented inside the control unit 180 and may be implemented separately from the control unit 180.

The control unit 180 may perform pattern recognition processing for recognizing handwriting input or drawing input on the touch screen as a text and an image, respectively.

Additionally, the control unit 180 may receive a sensing value for a terminal case 200 from the sensing unit 140 to recognize a state of the terminal case 200.

The power supply unit 190 may receive external power or internal power under a control of the control unit 180 and may then supply power necessary for an operation of each component.

Various embodiments described herein may be implemented in recording media that can be readable by computers or devices similar thereto through software, hardware, or a combination thereof.

According to the hardware implementation, embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions. In some cases, such embodiments may be implemented by the control unit 180.

According to the software implementation, embodiments such as procedures or functions may be implemented together with additional software modules for performing at least one function or operation. Software codes may be implemented by a software application written in an appropriate program language. Software codes may be stored in the memory 160 and may be executed by the control unit 180.

The above-mentioned terminal 100 may be a portable terminal or a vehicle mount terminal. Accordingly, the terminal 100 may be in the form that a user can carry directly or may be in the form that is mounted on a predetermined area.

Moreover, a terminal may expand to a wearable device that can be worn on the body beyond the level that a user mainly grabs the mobile terminal by a hand. Such a wearable device may include a smart watch, a smart glass, and a head-mounted display (HMD).

A terminal case 200 capable of being coupled with the terminal 100 will be described in more detail.

Figure 2:
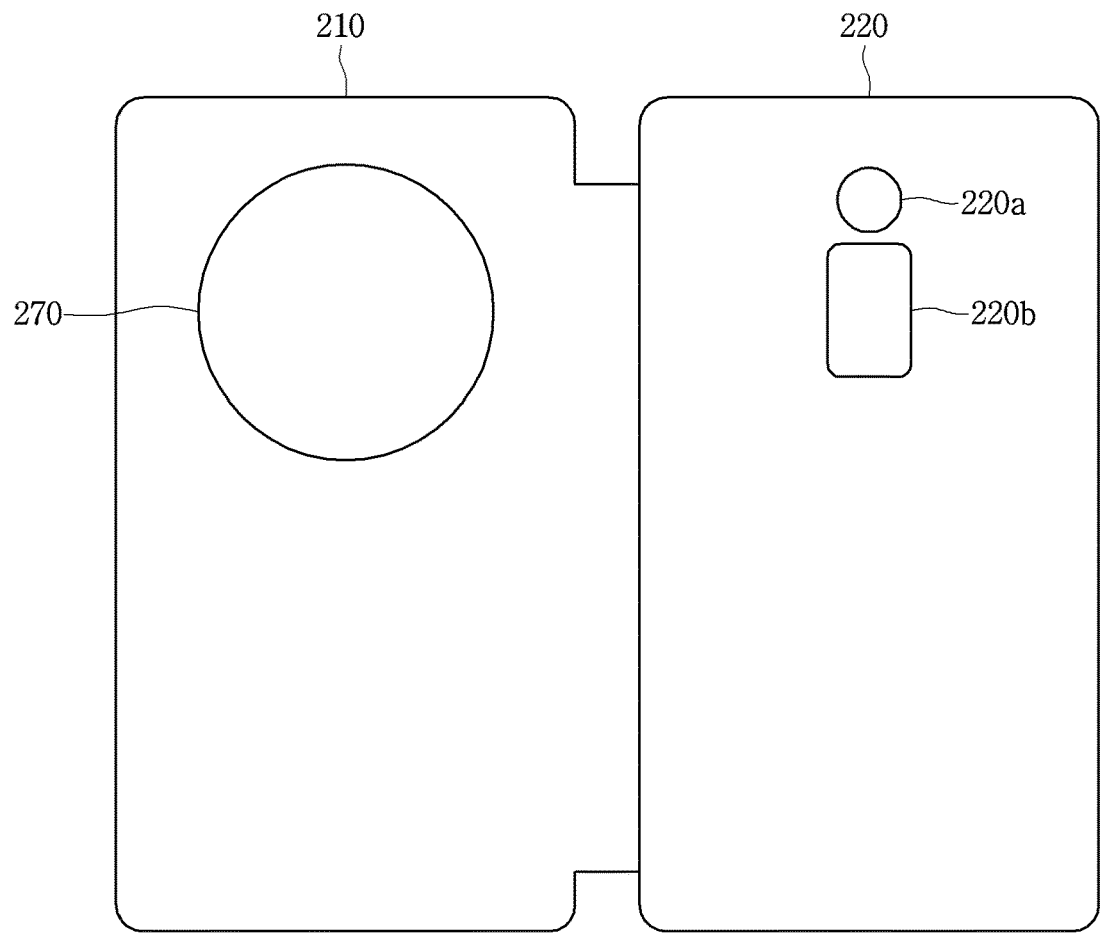
FIG. 2 is a view illustrating a terminal case according to an embodiment of the present invention.

FIG. 2 is a view illustrating a terminal case according to an embodiment of the present invention.

Referring to FIG. 2, a terminal case 200 may include a case front part 210 and a case rear part 220. Additionally, the terminal case 200 may include a connection part (not shown) connecting the case front part 210 and the case rear part 220 and may further include a coupling part (not shown) for coupling the terminal case 200 with the terminal 100.

When each configuration is described in more detail, a coupling part (not shown) is formed to cover the side and rear of the terminal 100 and its front has an open form to allow the detachment of the terminal 100. Accordingly, a space where the terminal 100 is receivable is formed inside the coupling part (not shown).

An opening part may be formed at the terminal case 200 to expose the camera 121 or other manipulation buttons equipped at one side of the terminal 100. For example, at least one opening part may be formed at the terminal case 200 to expose cameras or other manipulation buttons equipped on at least one of the front, side, and rear of a terminal.

The case front part 210 may be formed of a plate-shaped member having a form corresponding to the front of the terminal 100. The case front part 210 may be equipped with an opening part. The opening part of the case front part 210 is formed by cutting a portion of the case front part 210. The opening part formed by incision may remain as an empty space and according to an embodiment, a transparent film may be attached to the opening part. A touch available film may be used for the transparent film. Additionally, a special film serving as a mirror when a display unit seen through an opening part is turned off may be used as the transparent film. For example, a user may see a picture or image displayed on the display unit 151 of the terminal 100 and may touch the display unit 151 through the front opening part 270.

Additionally, the case front part 210 may further include an opening part corresponding to a sensor of the terminal 100. This will be described later.

The case rear part 220 may be formed of a plate-shaped member having a form corresponding to the rear of the terminal 100. The case rear part 220 may be equipped with an opening part. The opening part of the case rear part 220 is formed by cutting a portion of the case rear part 220. The opening part formed by incision may remain as an empty space and according to an embodiment, a transparent film may be attached to the opening part. A touch available film may be used for the transparent film. For example, the case rear part 220 may include a first rear opening part 220a corresponding to the camera 121 of the terminal 100. Additionally, the case rear part 220 may include a second rear opening part 220b corresponding to a manipulation button located at the rear of the terminal 100.

A connection part (not shown) may connect the case front part 210 and the case rear part 220 and may be formed of a flexile material.

Moreover, a magnetic material may be mounted at the case front part 210. This will be described with reference to FIG. 3.

Figure 3:
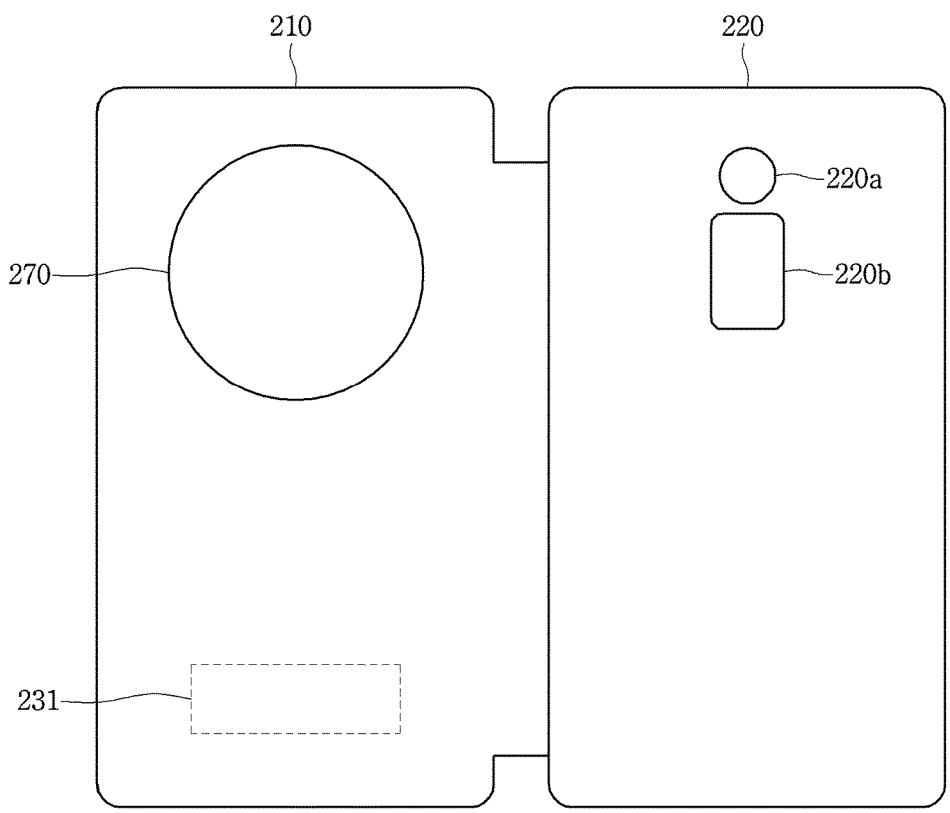
FIG. 3 is a view illustrating a terminal case including a magnetic material mounted thereon according to an embodiment of the present invention.

FIG. 3 is a view illustrating a terminal case 200 including a magnetic material mounted thereon according to an embodiment of the present invention.

Referring to FIG. 3, a case front part 210 may include a front magnetic material 231. When the front magnetic material 231 is included at the case front part 210, changes in magnetic field may occur as the case front part 210 is opened or closed. The terminal 100 coupled with the terminal case 200 may detect such changes in magnetic field through the sensing unit 140. This will be described later.

Moreover, a magnetic material may be mounted at the case rear part 220. This will be described with reference to FIG. 4.

Figure 4:
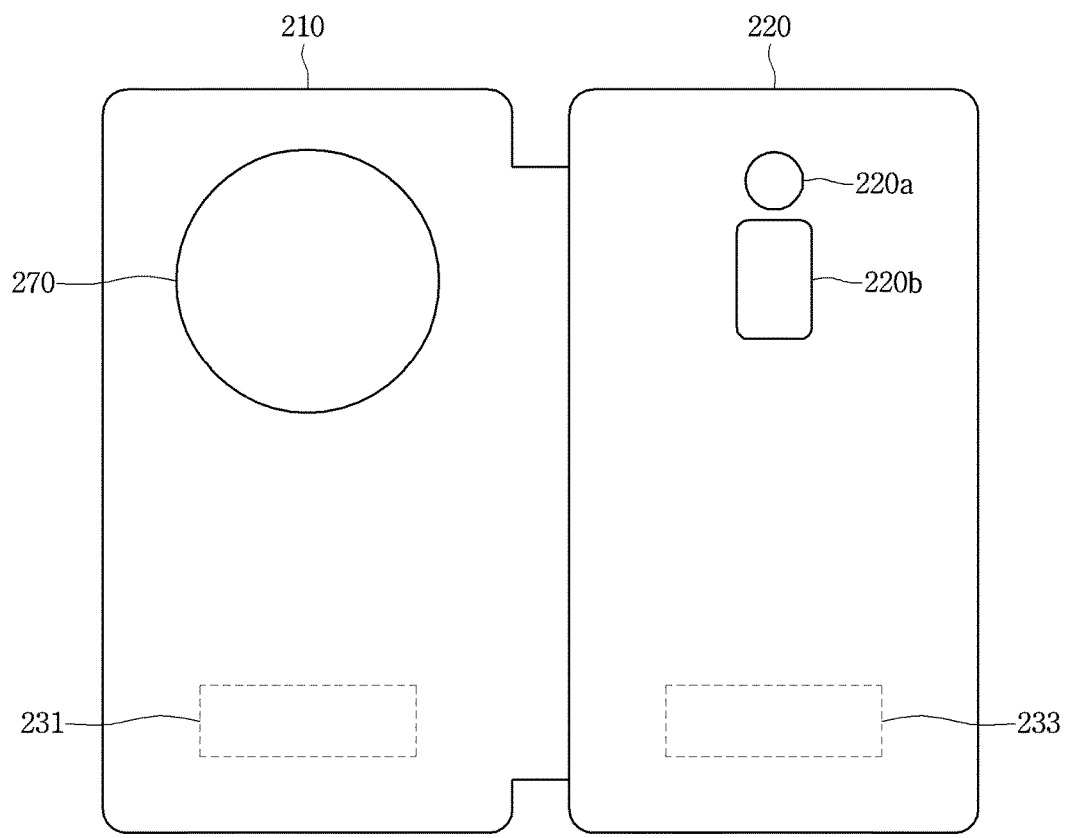
FIG. 4 is a view illustrating a terminal case including a magnetic material mounted thereon according to another embodiment of the present invention.

FIG. 4 is a view illustrating a terminal case including a magnetic material mounted thereon according to another embodiment of the present invention.

Referring to FIG. 4, a case front part 210 and a case rear part 220 may include a front magnetic material 231 and a rear magnetic material 233, respectively. When the front magnetic material 231 is included at the case front part 210, changes in magnetic field may occur as the case front part 210 is opened or closed. When the rear magnetic material 233 is included at the case rear part 220, the terminal 100 coupled with the terminal case 200 may detect such changes in magnetic field through the sensing unit 140 as the case front part 210 is opened and closed. In more detail, the sensing unit 140 may detect changes in magnetic field in the front or rear direction of the terminal 100. For example, the sensing unit 140 may detect a magnetic field for each of the front magnetic material 231 and the rear magnetic material 233 when the case front part 210 is disposed at the front of the terminal 100. Additionally, the sensing unit 140 may detect a magnetic field for each of the front magnetic material 231 and the rear magnetic material 233 when the case front part 210 is disposed at the rear of the terminal 100. Additionally, the sensing unit 140 may detect a magnetic field for each of the front magnetic material 231 and the rear magnetic material 233 when the case front part 210 is not disposed at the front or rear of the terminal 100. This will be described later.

Moreover, when the case front part 210 is disposed at the rear of the terminal 100, the front magnetic material 231 may be coupled with the rear magnetic material 233 magnetically.

Hereinafter, the sensing unit 140 for sensing a magnetic material included in the terminal case 200 will be described in more detail with reference to FIGS. 5 and 6.

Figure 5:
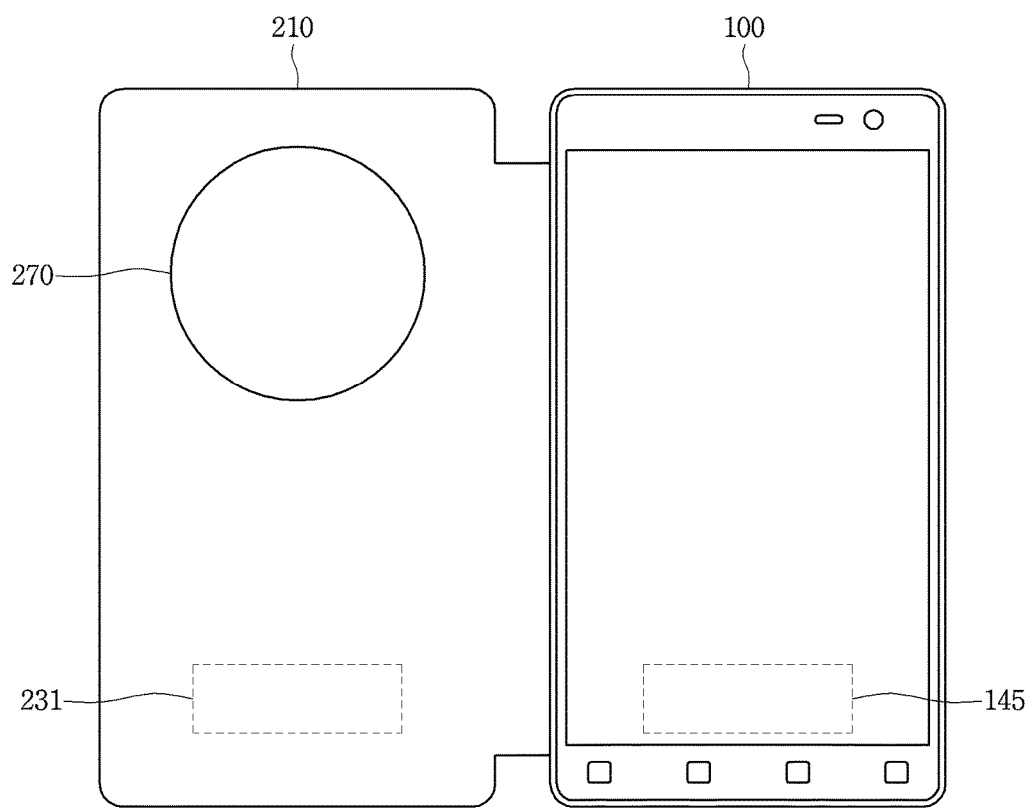
FIG. 5 is a view illustrating a magnetic sensor of a terminal according to an embodiment of the present invention.

FIG. 5 is a view illustrating a magnetic sensor of a terminal according to an embodiment of the present invention.

Referring to FIG. 5, the terminal 100 may include a magnetic sensor 145 for sensing a magnetic field. The magnetic sensor 145 may be included in the sensing unit 140. The magnetic sensor 145 may sense the amplitude and direction of a magnetic field corresponding to at least one magnetic material. For example, the magnetic sensor 145 may detect a magnetic field by the front magnetic material 231 according to a movement of the case front part 210. Additionally, the magnetic sensor 145 may detect a magnetic field change of the front magnetic material 231 included at the case front part 210 and a rear magnetic material 233 included at the case rear part 220. Moreover, the magnetic sensor 145 may be located at positions respectively corresponding to the front magnetic material 231 and the rear magnetic material 233.

Moreover, the magnetic sensor 145 may include a plurality of magnetic sensors. This will be described with reference to FIG. 6.

FIG. 6 is a sectional view of a terminal including a plurality of magnetic sensors according to an embodiment of the present invention.

Referring to FIG. 6, the terminal 100 may include a magnetic sensor 145 with a plurality of magnetic sensors such as a front magnetic sensor 146 and a rear magnetic sensor 147. The front magnetic sensor 146 may detect a magnetic field for the front direction of the terminal 100. The rear magnetic sensor 147 may detect a magnetic field for the rear direction of the terminal 100. Accordingly, the magnetic sensor 145 may detect each magnetic field for the direction of at least one of the front and rear of the terminal 100.

Moreover, the terminal 100 may recognize a state of the terminal case 200 through the proximity sensor. In more detail, the terminal 100 may sense the terminal case 200 through a proximity sensor located at one side of the terminal 100. This will be described with reference to FIGS. 7 to 9.

Figure 7:
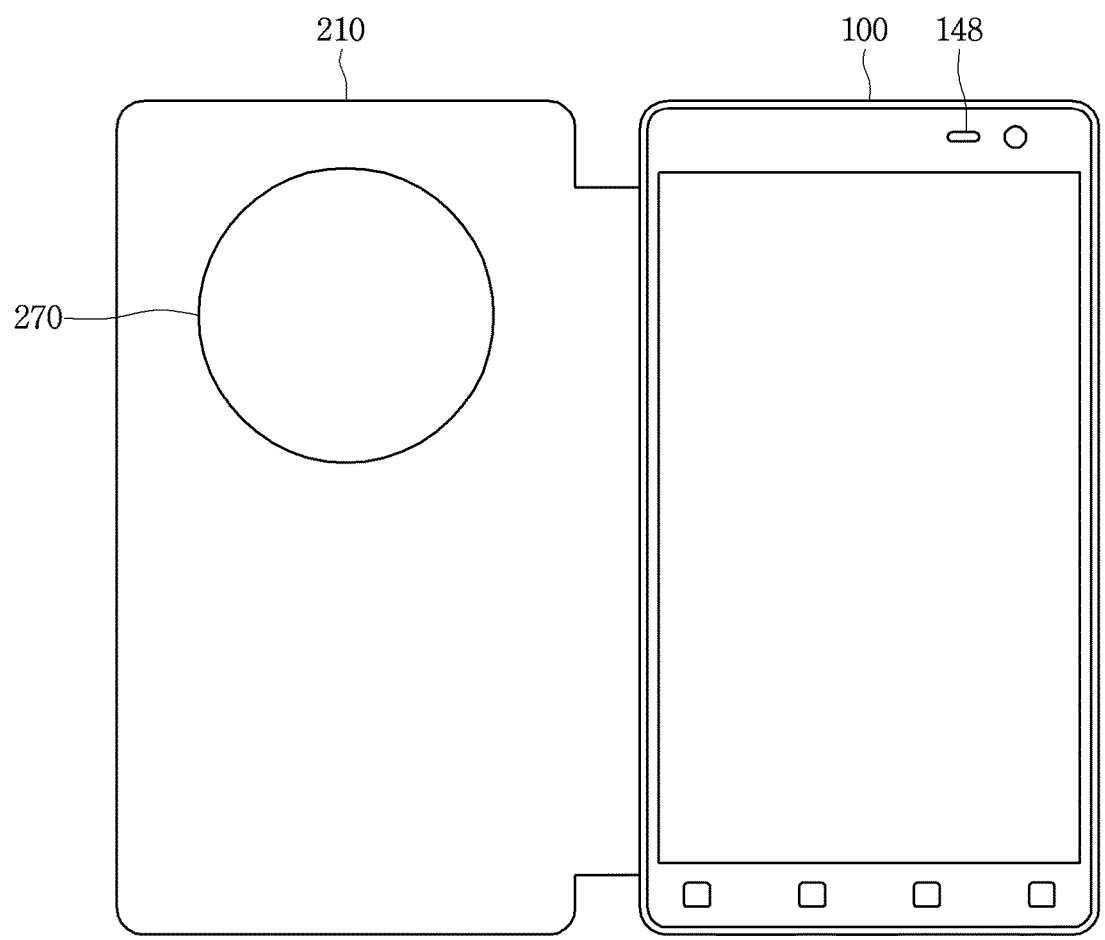
FIG. 7 is a view illustrating a front sensor of a terminal according to an embodiment of the present invention.

FIG. 7 is a view illustrating a front sensor of a terminal according to an embodiment of the present invention.

Referring to FIG. 7, the terminal 100 may include a front sensor 148 at the front of the terminal 100. The front sensor 148 may sense the front direction of the terminal 100. Accordingly, the front sensor 148 may sense a case front part 210 of the terminal case 200. For example, the front sensor 148 may sense each of a state in which the case front part 210 covers the front of the terminal 100 and a state in which the case front part 210 does not cover the front of the terminal 100.

Figure 8:
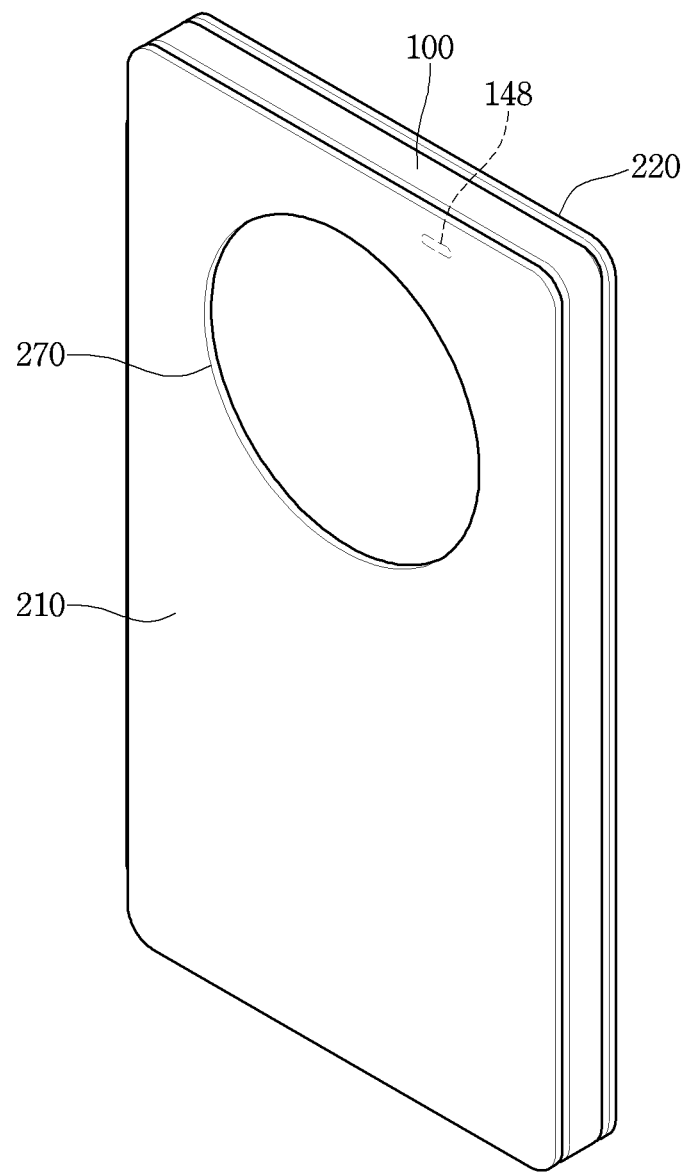
FIG. 8 is a view illustrating sensing a front sensor of a terminal according to an embodiment of the present invention.

Referring to FIG. 8, sensing the case front part 210 of the front sensor 148 will be described.

FIG. 8 is a view illustrating sensing a front sensor of a terminal according to an embodiment of the present invention.

Referring to FIG. 8, a front sensor 148 of the terminal 100 may sense a case front part 210 corresponding to the front sensor 148 when the case front part 210 covers the terminal 100. Additionally, the front sensor 148 may sense a distance with the case front part 210 corresponding to the front sensor 148.

Moreover, the terminal 100 may include a rear sensor 149 at the rear of the terminal 100. This will be described with reference to FIG. 9.

Figure 9:
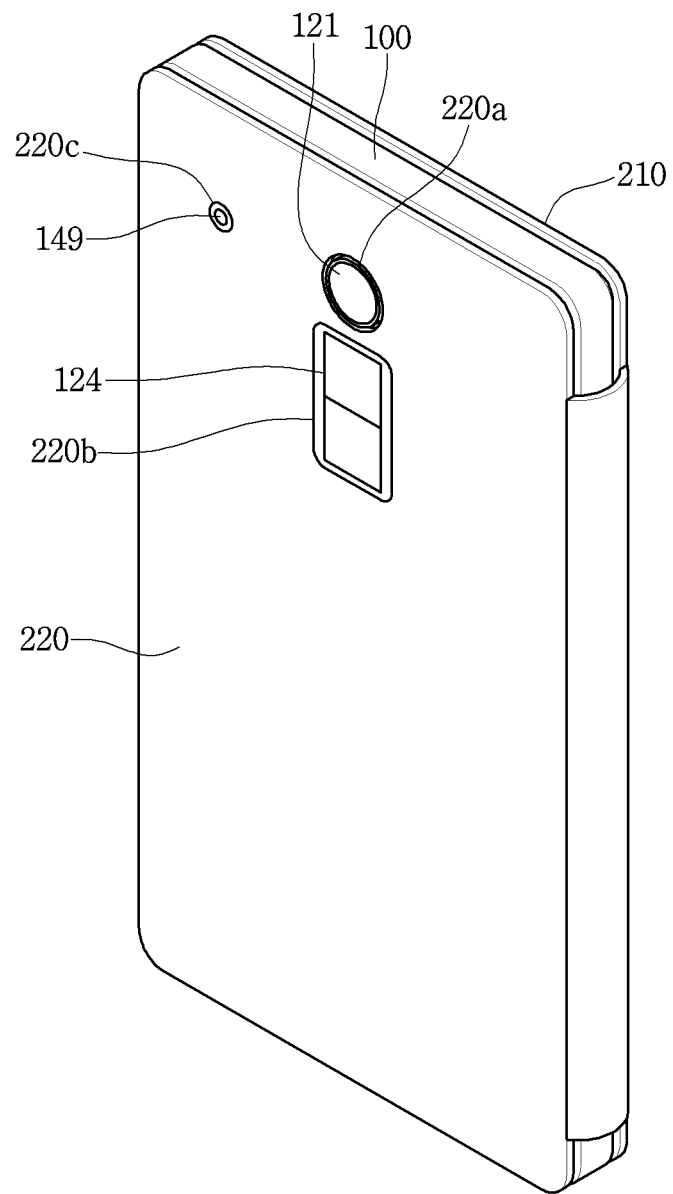
FIG. 9 is a view illustrating a terminal coupled with a terminal case according to an embodiment of the present invention.

FIG. 9 is a view illustrating a terminal coupled with a terminal case according to an embodiment of the present invention.

Referring to FIG. 9, each of a rear sensor 149, a camera 121, and a manipulation button 124 located at the rear of a terminal 100 coupled with a terminal case 200 may be exposed through at least one opening part included at a case rear part 220. For example, the case rear part 220 may include a first rear opening part 220a corresponding to the camera 121, a second rear opening part 220b corresponding to the manipulation button 124, and a third rear opening part 220c corresponding to the rear sensor 149.

The rear sensor 149 may sense the rear direction of the terminal 100. Accordingly, the rear sensor 149 may sense the case front part 210 when the case front part 210 is flipped over against the rear of the terminal 100. This will be described with reference to FIG. 10.

Figure 10:
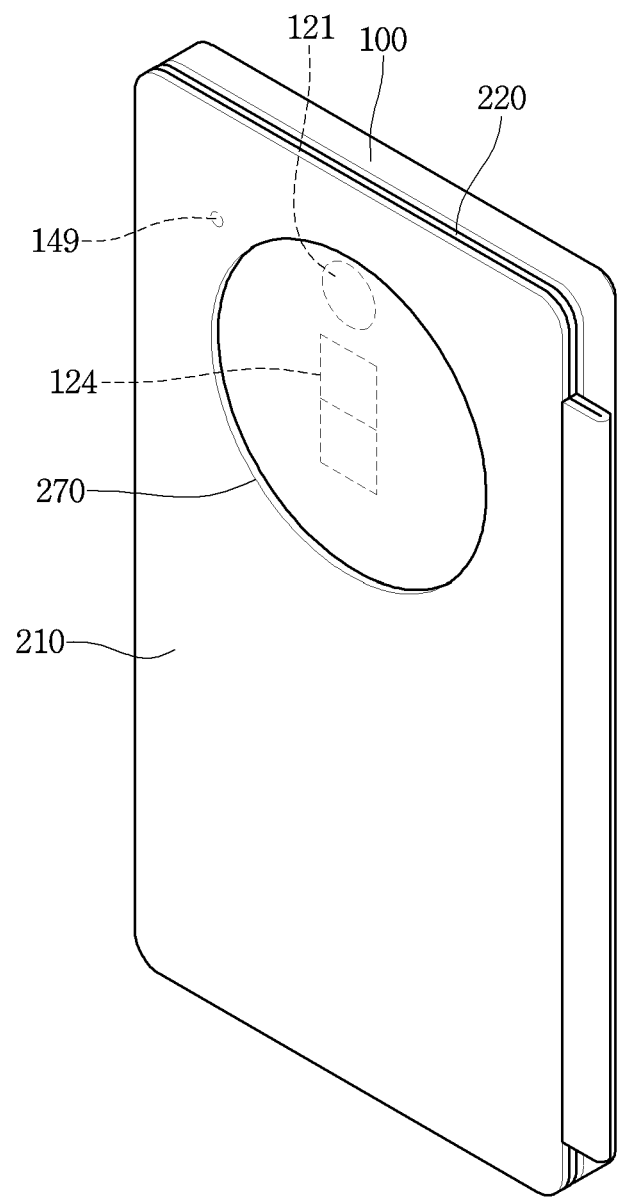
FIG. 10 is a view illustrating sensing a rear sensor of a terminal according to an embodiment of the present invention.

FIG. 10 is a view illustrating sensing a rear sensor of a terminal according to an embodiment of the present invention.

Referring to FIG. 10, a rear sensor 149 of a terminal 100 may sense a case front part 210 when the case front part 210 is flipped over against the rear of the terminal 100. Accordingly, the rear sensor 149 may sense a distance with the case front part 210 corresponding to the rear sensor 149.

Hereinafter, an operating method of the terminal will be described on the basis of description for the terminal 100 and the terminal case 200.

Figure 11:
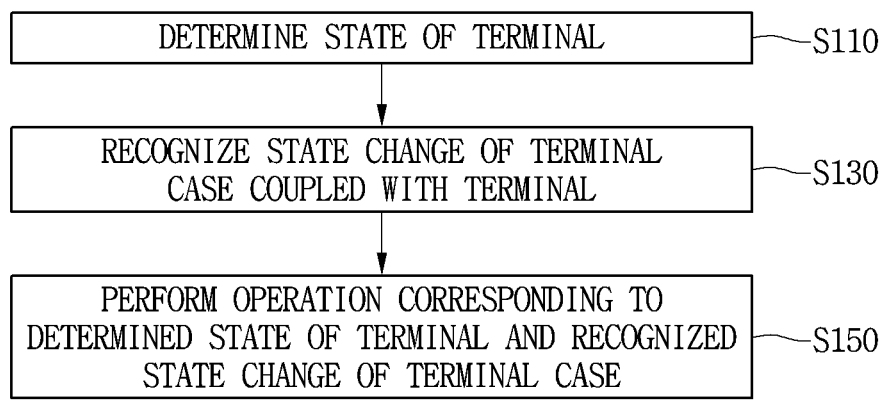
FIG. 11 is a flowchart illustrating an operation method performed at a terminal according to an embodiment of the present invention.

FIG. 11 is a flowchart illustrating an operation method performed at a terminal according to an embodiment of the present invention.

Referring to FIG. 11, the control unit 180 of the terminal 100 determines a state of the terminal 100 in operation S110.

Herein, a state of a terminal may mean at least one of an operating state of the terminal 100 and a state of the terminal case 200 coupled with the terminal 100. Accordingly, the control unit 180 may determine at least one of an operating state of the terminal 100 and a state of the terminal case 200 coupled with the terminal 100.

According to an embodiment, the control unit 180 may determine whether the display unit 151 is turned on or off. In more detail, the control unit 180 may determine whether the display unit 151 of the terminal 100 is turned on or off, a screen displayed on the display unit 151, and an operation corresponding to a screen being displayed on the display unit 151.

According to another embodiment, the control unit 180 may determine a state of the terminal case 200 coupled with the terminal 100. Herein, a state of the terminal case 200 may mean the position of the case front part 210 of the terminal case 200 coupled with the terminal 100. A state of a terminal case will be described with reference to FIGS. 12 to 14.

Figure 12:
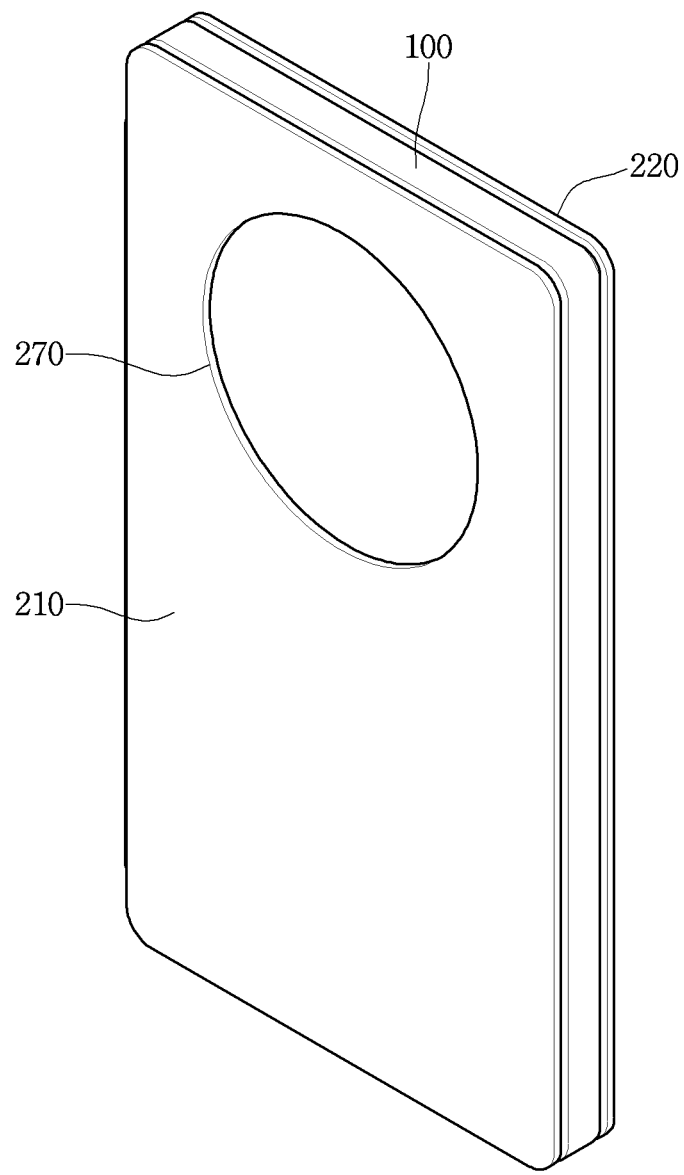
FIG. 12 is a view illustrating a first case state of a terminal case according to an embodiment of the present invention.

FIG. 12 is a view illustrating a first case state of a terminal case according to an embodiment of the present invention.

Referring to FIG. 12, a case front part 210 of a terminal case 200 coupled with a terminal 100 may cover the front of the terminal 100. In such a way, a state in which the case front part 210 of the terminal case 200 coupled with the terminal 100 covers the front of the terminal 100 is referred to as a "first case state".

Figure 13:
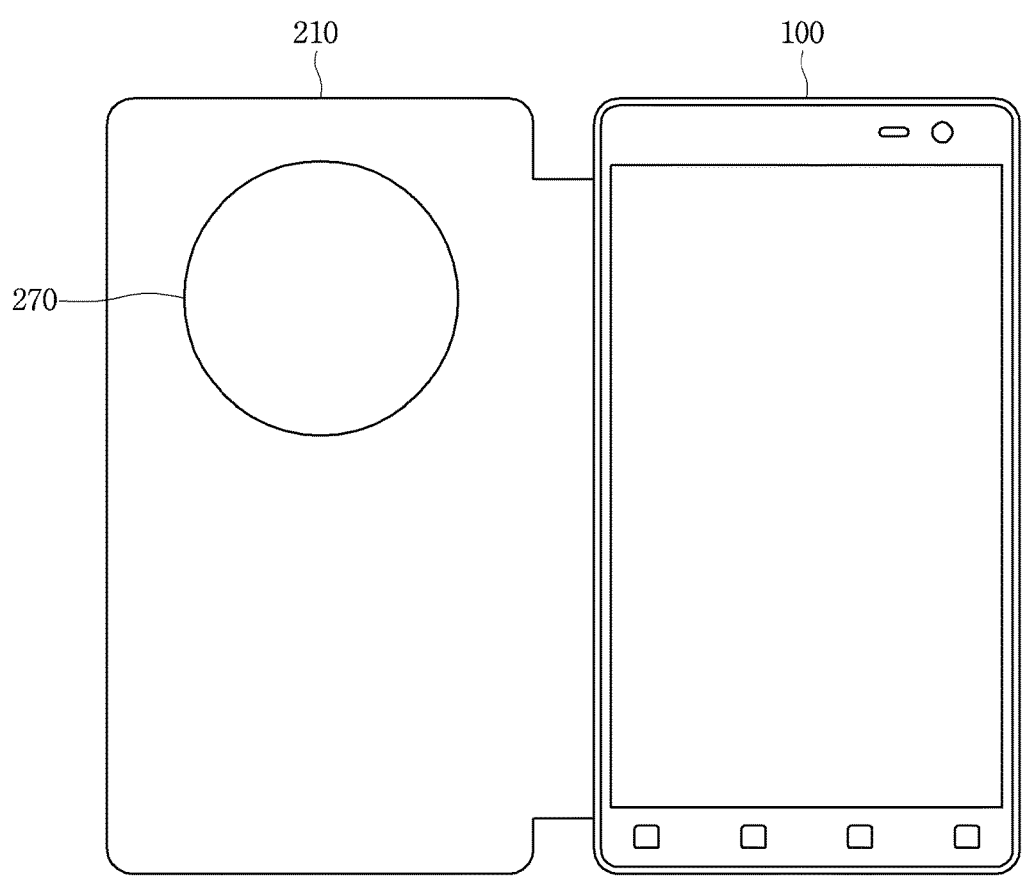
FIG. 13 is a view illustrating a second case state of a terminal case according to an embodiment of the present invention.

FIG. 13 is a view illustrating a second case state of a terminal case according to an embodiment of the present invention.

Referring to FIG. 13, a case front part 210 of a terminal case 200 coupled with a terminal 100 may be disposed in the width direction of the terminal 100. This may be a state in which the case front part 210 of the terminal case 200 coupled with the terminal 100 is stretched. In such a way, a state in which the case front part 210 of the terminal case 200 coupled with the terminal 100 is disposed in the width direction of the terminal 100 is referred to as a "second case state".

Figure 14:
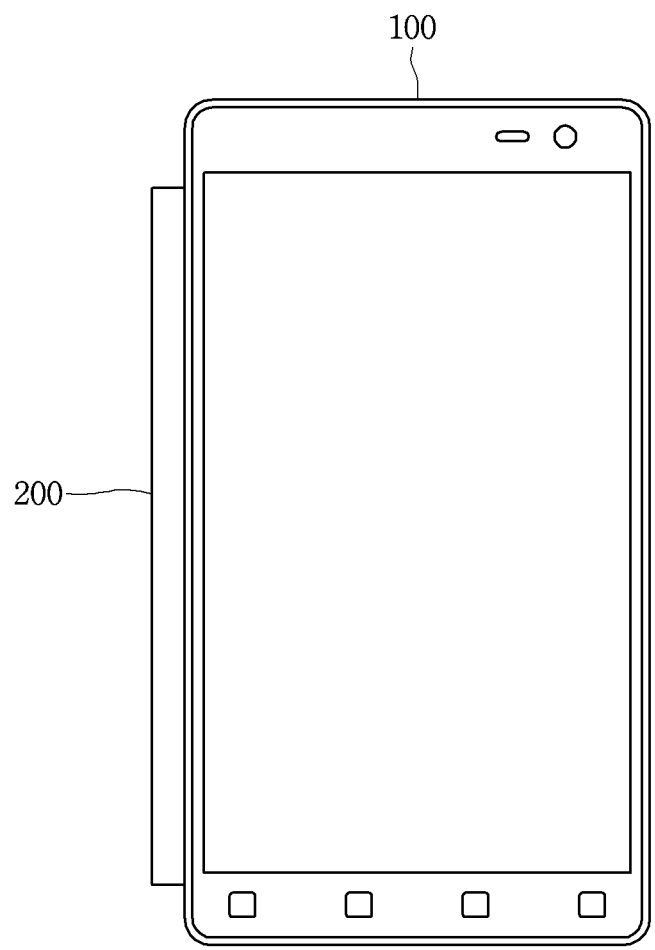
FIG. 14 is a view illustrating a third case state of a terminal case according to an embodiment of the present invention.

FIG. 14 is a view illustrating a third case state of a terminal case according to an embodiment of the present invention.

Referring to FIG. 14, a case front part 210 of a terminal case 200 coupled with a terminal 100 may be disposed at the rear of the terminal 100. This may be a state in which the case front part 210 of the terminal case 200 coupled with the terminal 100 is flipped over in the rear direction of the terminal 100. In such a way, a state in which the case front part 210 of the terminal case 200 coupled with the terminal 100 covers the rear of the terminal 100 is referred to as a "third case state".

FIG. 11 is referenced again.

The control unit 180 of the terminal 100 recognizes a case state change of the terminal case 200 coupled with the terminal 100 in operation S130.

The control unit 180 may recognize a case state change of the terminal case 200 through the sensing unit 140. In more detail, the control unit 180 may obtain a sensing value for the terminal case 200 from at least one of the magnetic sensor 145 and the proximity sensor included in the sensing unit 140 and may recognize a case state change of the terminal case 200 on the basis of the obtained sensing value.

According to an embodiment, at least one of the front magnetic sensor 146 and the rear magnetic sensor 147 included in the magnetic sensor 145 may sense at least one of the front magnetic material 231 and the rear magnetic material 233 included in the terminal case 200. The control unit 180 may recognize a case state change of the terminal case 200 on the basis of at least one of the magnitude of magnetic field and the direction of magnetic field, which are sensing values sensed by at least one of the front magnetic sensor 146 and the rear magnetic sensor 147 included in the magnetic sensor 145.

According to another embodiment, at least one of the front sensor 148 and the rear sensor 149 included in the proximity sensor may sense a distance corresponding to the case front part 210 of the terminal case 200. The control unit 180 may recognize a case state change of the terminal case 200 on the basis of a distance corresponding to the case front part 210, which is a sensing value sensed by at least one of the front sensor 148 and the rear sensor 149 included in the proximity sensor.

The control unit 180 of the terminal 100 performs an operation corresponding to a determined state of a terminal and a recognized state change of a terminal in operation S150.

The control unit 180 may perform an operation corresponding to a state of a terminal determined in operation S110 and a state change of a terminal case recognized in operation S130.

For example, when a terminal's case state change is recognized, for example, when the first case state is changed to the second case state or the third case state, the control unit 180 may perform an operation relating to an operation corresponding to a screen being displayed on the display unit 151 in the first case state.

As another example, when a terminal's case state change is recognized, for example, when the third case state is changed to the second case state or the first case state, the control unit 180 may perform an operation relating to an operation corresponding to a screen being displayed on the display unit 151 in the third case state.

As another example, when it is recognized that the second case state is changed to the third case state, the control unit 180 may perform an operation relating to an operation corresponding to a screen being displayed on the display unit 151 in the second case state.

This will be described with reference to FIGS. 15 to 24.

Figure 15:
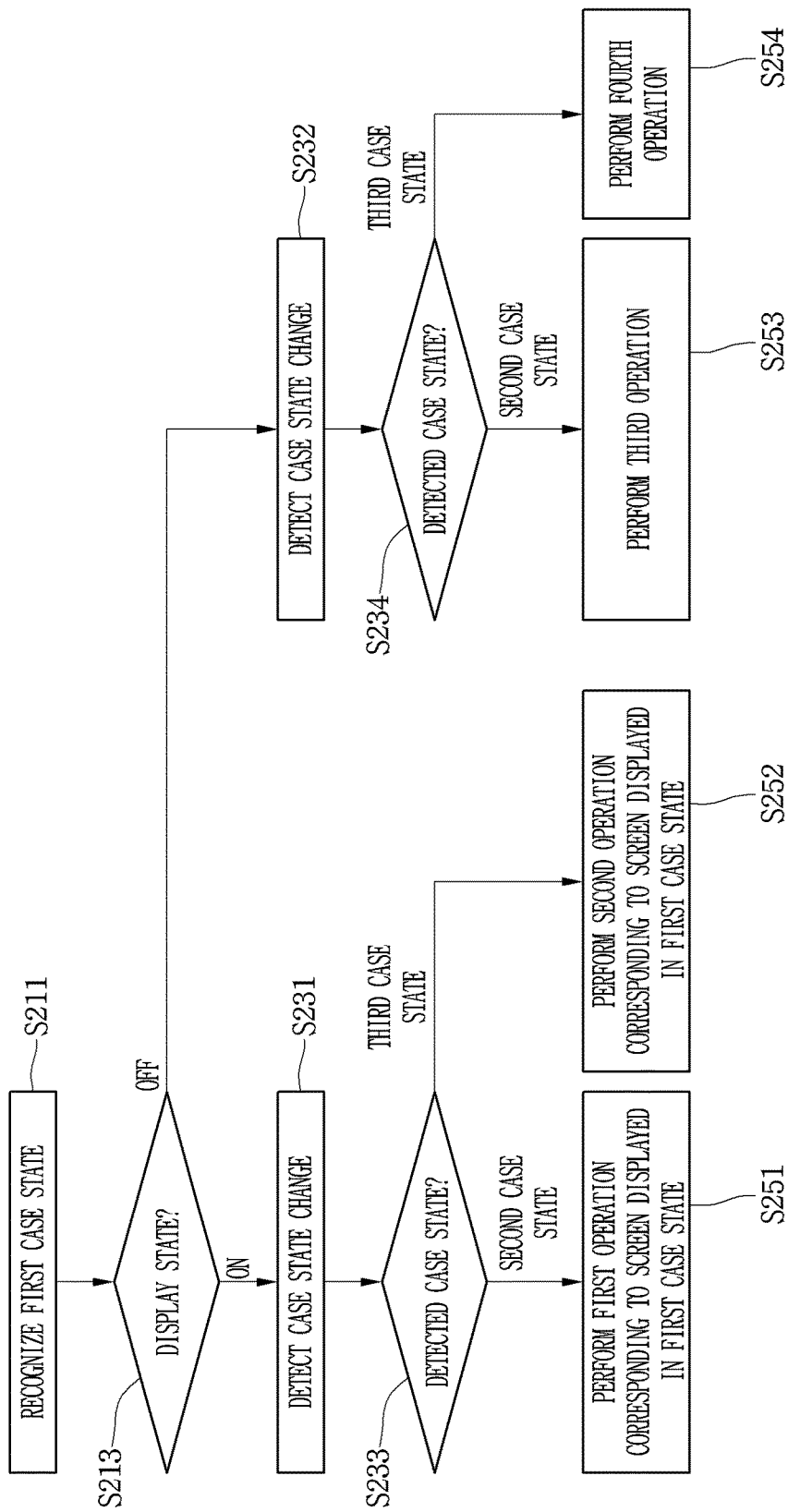
FIG. 15 is a flowchart illustrating a terminal operation according to a first embodiment of the present invention.

FIG. 15 is a flowchart illustrating a terminal operation according to a first embodiment of the present invention.

Referring to FIG. 15, the control unit 180 of the terminal 100 recognizes the first case state in which the case front part 210 of the terminal case 200 coupled with the terminal 100 covers the front of the terminal 100 in operation S211.

The control unit 180 may recognize a state of the terminal case 200 coupled with the terminal 100 via the sensing unit 140. In more detail, the control unit 180 may recognize the position of the case front part 210 via at least one of the magnetic sensor 145 and the proximity sensor. Accordingly, the control unit 180 may recognize whether the terminal case 200 coupled with the terminal 100 is in the first case state. Since this is described above, detailed description will be omitted.

Additionally, the control unit 180 may determine an operating state of a terminal in a first case state. Since a state determination of a terminal is described above, detailed description is omitted.

The control unit 180 determines a state of the display unit 151 in the first case state in operation S213, and detects a case state change when the display unit 151 is on in operation S231.

The control unit 180 may turn on the display unit 151 in the first case state and may display a screen relating to an operation of the terminal 100 on the display unit 151. A user may see a screen displayed on the display unit 151 in the first case state through the front opening part 270 located at the case front part 210. This will be described with reference to FIG. 16.

Figure 16:
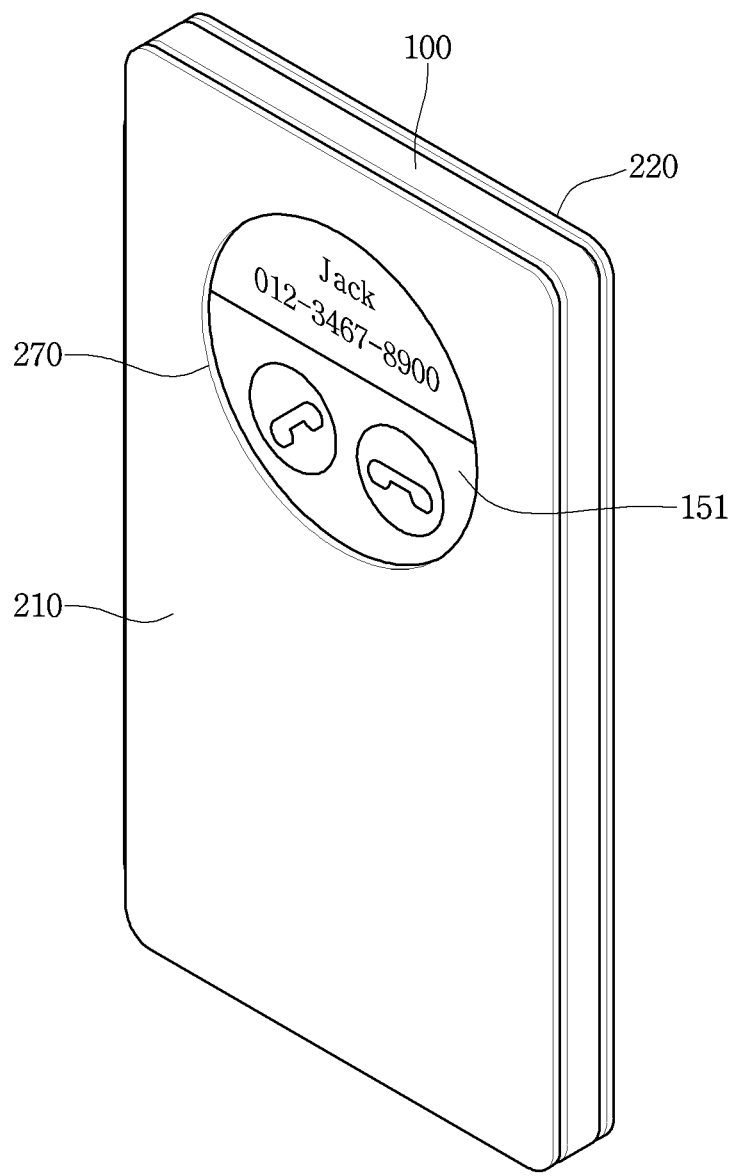
FIG. 16 is a view illustrating a terminal screen display in a first case state according to an embodiment of the present invention.

FIG. 16 is a view illustrating a terminal screen display in a first case state according to an embodiment of the present invention.

Referring to FIG. 16, the control unit 180 may display a call reception screen relating to a call received by a terminal in the first case state. The control unit 180 may display a call reception screen only at a position corresponding to the front opening part 270 located at the case front part 210.

In such a way, the control unit 180 may turn on the display unit 151 in the first case state and may display a screen relating to an operation of the terminal 100 on the display unit 151. Description for a screen display on a call reception in the above-mentioned first case state is just an example, and thus, a terminal screen display in the first case state is not limited thereto. Therefore, according to a user's or designer's selection, a screen relating to various terminal operations may be displayed on the display unit 151 in the first case state. For example, the control unit 180 may display on the display unit 151 a screen relating to an operation for at least one of video playback, music playback, message reception, current time display, or weather display in the first case state.

Moreover, when the display unit 151 is turned on in the first case state, the control unit 180 may recognize that a state of the terminal case 200 coupled with the terminal 100 changes from the first case state to another case state. In more detail, when a sensing value of the sensing unit 140 is changed in the first case state, the control unit 180 may recognize that a state of the terminal case 200 coupled with the terminal 100 changes from the first case state to another case state. Accordingly, the control unit 180 may detect that the terminal case 200 coupled with the terminal 100 changes from the first case state to another case state.

When the detected case state is the second case state in operation S233, the control unit 180 performs a first operation corresponding to a screen being displayed on the display unit 151 in the first case state in operation S251.

The control unit 180 may determine a changed case state on the basis of a sensing value of the sensing unit 140. Since this is described above, detailed description will be omitted.

When it is determined that a state of the terminal case 200 coupled with the terminal 100 changes from the first case state to the second case state on the basis of a sensing value of the sensing unit 140, the control unit 180 may perform a preset first operation. Various operations may be set in the preset first operation according to a user's or designer's setting.

The control unit 180 may perform a first operation requiring a simple manipulation among operations of a terminal corresponding to a screen displayed on the display unit 151 in the first case state. Herein, the simple manipulation may mean a manipulation requiring a user input of less than a reference number of times.

An embodiment is described with reference to FIG. 17.

Figure 17:
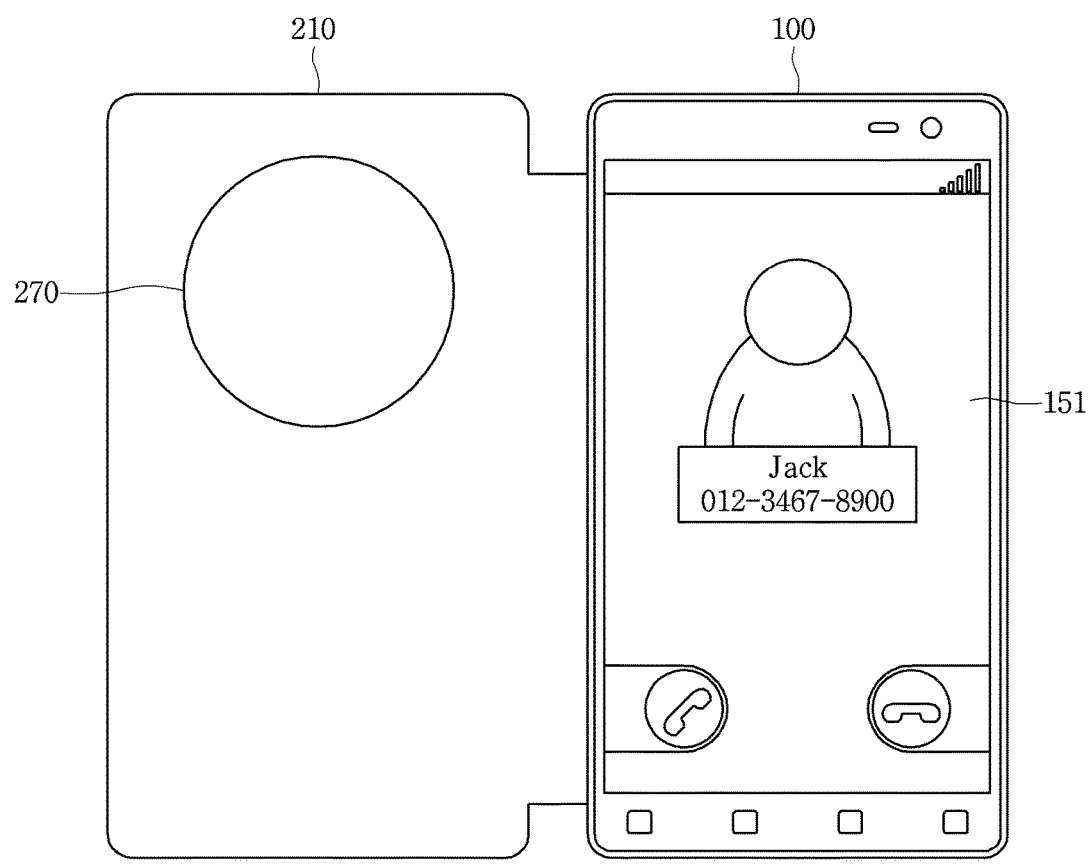
FIG. 17 is a view illustrating a first operation corresponding to a call reception screen according to an embodiment of the present invention.

FIG. 17 is a view illustrating a first operation corresponding to a call reception screen according to an embodiment of the present invention.

Referring to FIG. 17, the control unit 180 may display a user input screen on whether a call is received through a first operation corresponding to a call reception screen displayed on the display unit 151 in the first case state. Accordingly, the control unit 180 may obtain a user input for call reception or call rejection.

In another embodiment, when a screen displayed on the display unit 151 is a watch display screen in the first case state, the control unit 180 may display a user's schedule on the display unit 151 as a first operation corresponding thereto.

In another embodiment, when a screen displayed on the display unit 151 is a weather display screen in the first case state, the control unit 180 may display weather at each predetermined time interval on the display unit 151 as a first operation corresponding thereto.

In another embodiment, when a screen displayed on the display unit 151 is a message display screen in the first case state, the control unit 180 may perform an operation for accessing a link address included in a message as a first operation corresponding thereto.

In another embodiment, when a screen displayed on the display unit 151 is a music playback screen in the first case state, the control unit 180 may perform an operation for searching for content relating to a song in playback as a first operation corresponding thereto.

In another embodiment, when a screen displayed on the display unit 151 is a picture capturing screen in the first case state, the control unit 180 may perform an operation for displaying a menu for editing a picture in capturing or a captured picture on the display unit 151.

Additionally, the control unit 180 may display a first screen for displaying a menu requiring a user input of less than a predetermined reference number of times during operations of a terminal corresponding to a screen displayed on the display unit 151 in the first case state.

An embodiment is described with reference to FIG. 18.

Figure 18:
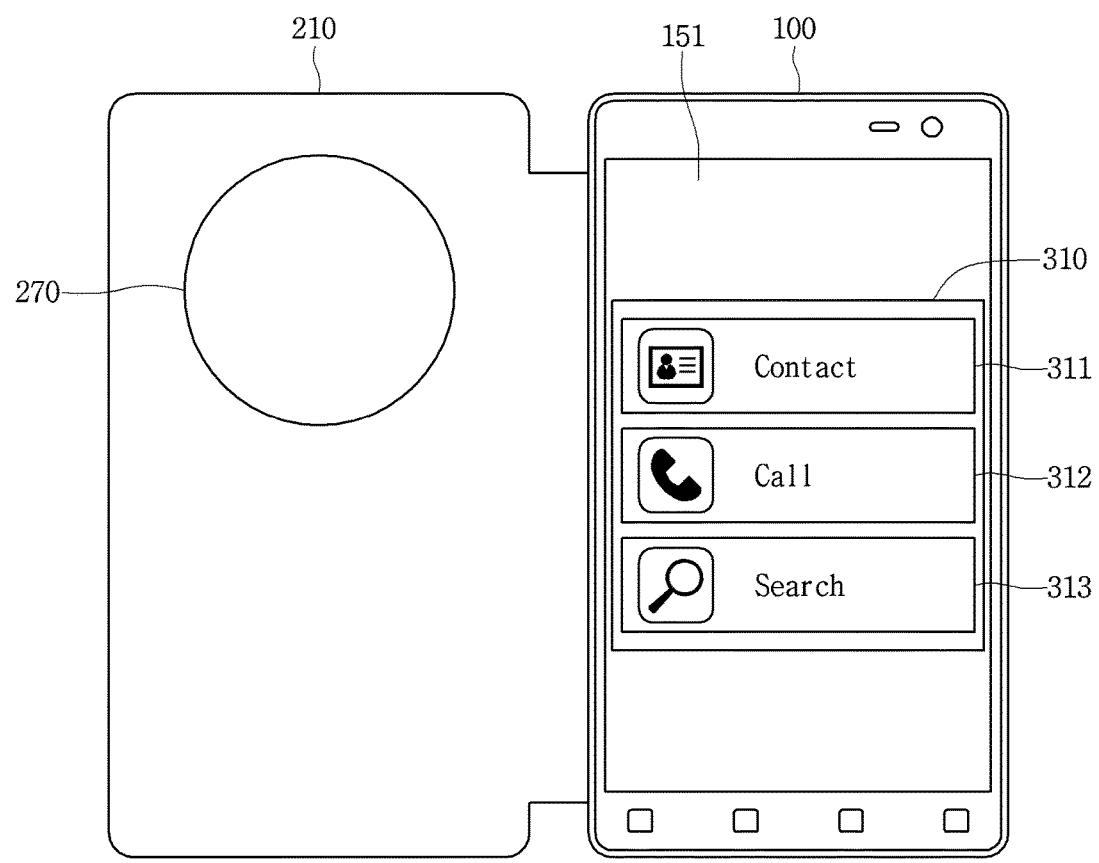
FIG. 18 is a view illustrating a first screen corresponding to a call termination screen according to an embodiment of the present invention.

FIG. 18 is a view illustrating a first screen corresponding to a call termination screen according to an embodiment of the present invention.

Referring to FIG. 18, the control unit 180 may display on the display unit 151 at least one menu for performing an operation relating to a terminated call as a first screen corresponding to a call termination screen displayed on the display unit 151 in the first case state. For example, the control unit 180 may display a first window 310 on the first screen. The first window 310 may include a menu for a contact 311, a call 312, and a search 313, which is a menu requiring a user input of less than a predetermined reference number of times. Accordingly, when a user input for selecting one of menus displayed on the first window 310 is obtained, the control unit 180 may execute a menu corresponding to the obtained user input. Then, the control unit 180 may perform an operation relating to a terminated call according to the executed menu.

Description for the above first operation is not limited to the above and the first operation may be set variously according to a user's or designer's selection.

FIG. 15 is referenced again.

When the detected case state is the third case state in operation S233, the control unit 180 performs a second operation corresponding to a screen being displayed on the display unit 151 in the first case state in operation S252.

The control unit 180 may determine a changed case state on the basis of a sensing value of the sensing unit 140. Since this is described above, detailed description will be omitted.

When it is determined that a state of the terminal case 200 coupled with the terminal 100 changes from the first case state into the third case state on the basis of a sensing value of the sensing unit 140, the control unit 180 may perform a preset second operation. Various operations may be set in the preset second operation according to a user's or designer's setting.

In one embodiment, the control unit 180 may perform the second operation requiring a complex manipulation among operations of a terminal corresponding to a screen displayed on the display unit 151 in the first case state. Herein, the complex manipulation may mean a manipulation requiring a user input of more than a reference number of times.

An embodiment is described with reference to FIG. 19.

Figure 19:
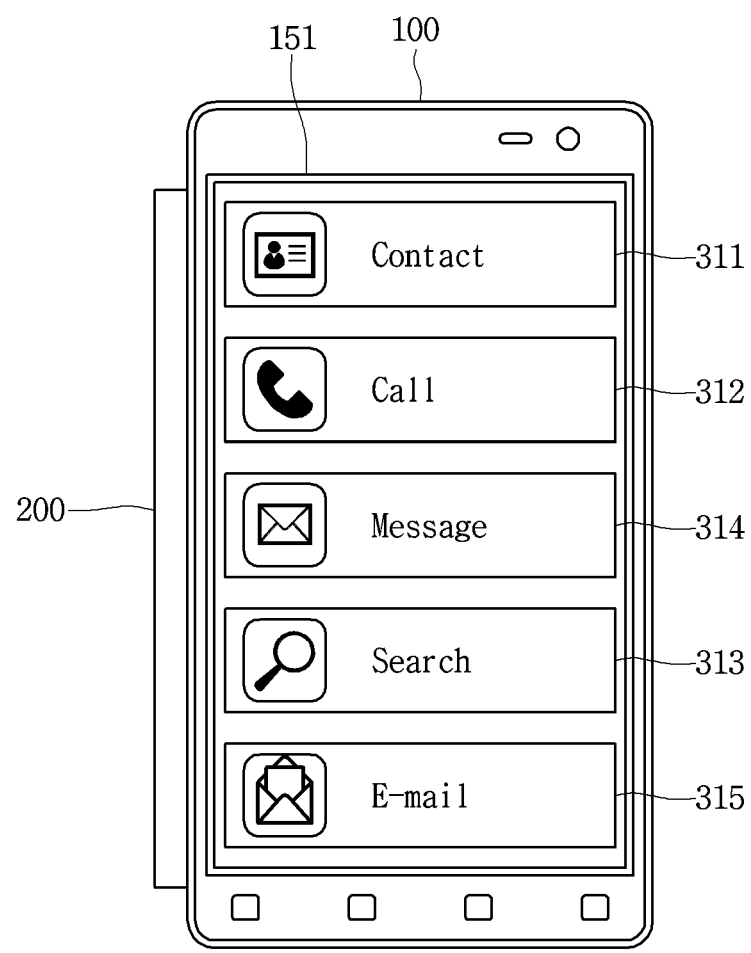
FIG. 19 is a view illustrating a second screen corresponding to a call termination screen according to an embodiment of the present invention.

FIG. 19 is a view illustrating a second screen corresponding to a call termination screen according to an embodiment of the present invention.

Referring to FIG. 19, the control unit 180 may display on the display unit 151 at least one menu for performing an operation relating to a terminated call as a second screen corresponding to a call termination screen displayed on the display unit 151 in the first case state. For example, the control unit 180 may display a plurality of menus for a contact 311, a call 312, a message 314, a search 313, and an e-mail 315 on the display unit 151, as a second screen. Accordingly, when a user input for selecting one of menus displayed on the display unit 151 is obtained, the control unit 180 may execute a menu corresponding to the obtained user input. Then, the control unit 180 may perform an operation relating to a terminated call according to the executed menu. Moreover, the control unit 180 may perform an operation relating to a screen displayed on the display unit 151 in the first case state, as the second operation.

An embodiment is described with reference to FIG. 20.

Figure 20:
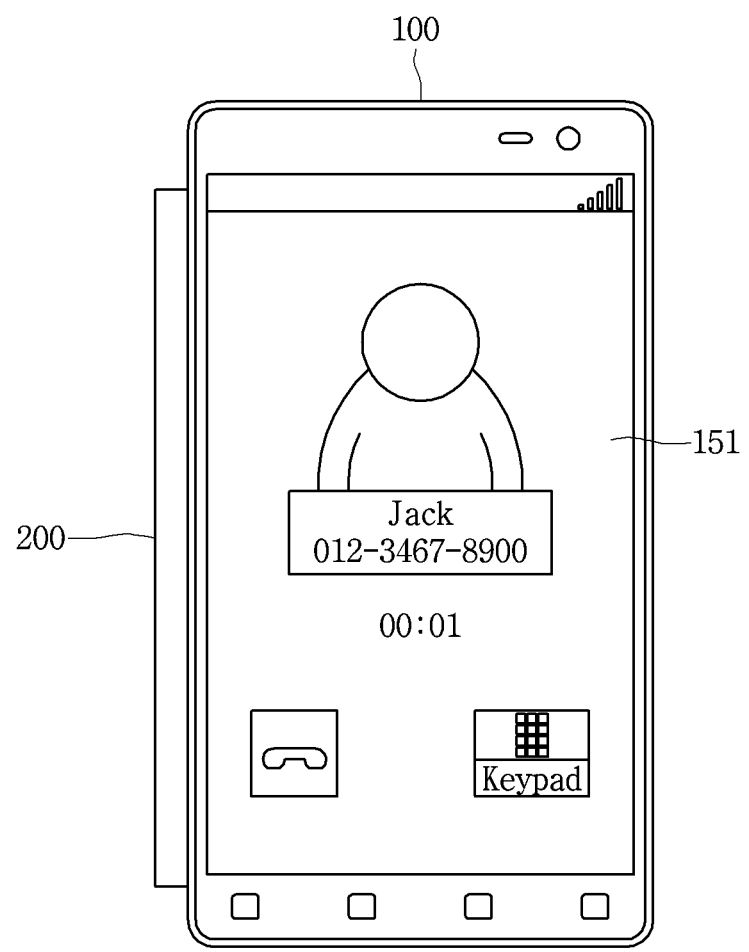
FIG. 20 is a view illustrating a second operation corresponding to a call reception screen according to an embodiment of the present invention.

FIG. 20 is a view illustrating a second operation corresponding to a call reception screen according to an embodiment of the present invention.

Referring to FIG. 20, the control unit 180 may receive a call as a second operation corresponding to a call reception screen displayed on the display unit 151 in the first case state. Accordingly, the control unit 180 may operate as a call mode with the other party corresponding to the received call without an additional user input acquisition.

In another embodiment, when a screen displayed on the display unit 151 is a watch display screen in the first case state, the control unit 180 may execute a watch application as a second operation corresponding thereto.

In another embodiment, when a screen displayed on the display unit 151 is a weather display screen in the first case state, the control unit 180 may execute a weather application as a second operation corresponding thereto.

In another embodiment, when a screen displayed on the display unit 151 is a message display screen in the first case state, the control unit 180 may execute a message application as a second operation corresponding thereto.

Description for the above first operation is not limited to the above and the second operation may be set variously according to a user's or designer's selection.

The control unit 180 determines a state of the display unit 151 in the first case state in operation S213, and detects a case state change when the display unit 151 is off in operation S232.

When the display unit 151 is turned off in the first case state, the control unit 180 may recognize that a state of the terminal case 200 coupled with the terminal 100 changes from the first case state to another case state on the basis of a sensing value of the sensing unit 140. In more detail, when a sensing value of the sensing unit 140 is changed in the first case state, the control unit 180 may recognize that a state of the terminal case 200 coupled with the terminal 100 changes from the first case state to another case state. Accordingly, the control unit 180 may detect that the terminal case 200 coupled with the terminal 100 changes from the first case state to another case state.

When the detected case state is the second case state in operation S234, the control unit 180 performs a predetermined third operation in operation S253.

When it is determined that a state of the terminal case 200 coupled with the terminal 100 changes from the first case state to the second case state on the basis of a sensing value of the sensing unit 140, the control unit 180 may perform a preset third operation. Various operations may be set in the preset third operation according to a user's or designer's setting.

As an embodiment, the third operation may be an operation for displaying an event relating to the current time. Accordingly, the control unit 180 may display on the display unit 151 a second window 350 that is an event window for displaying at least one event relating to the current time, as a predetermined third operation. Herein, an event relating to the current time may be an event for at least one of a user's schedule, alarm, to-do list, missing call, or missing message. Herein, the event may be a predetermined event. Accordingly, the control unit 180 may display an event for a specific person and a specific application on a second window 350 that is an event window.

This will be described with reference to FIG. 21.

Figure 21:
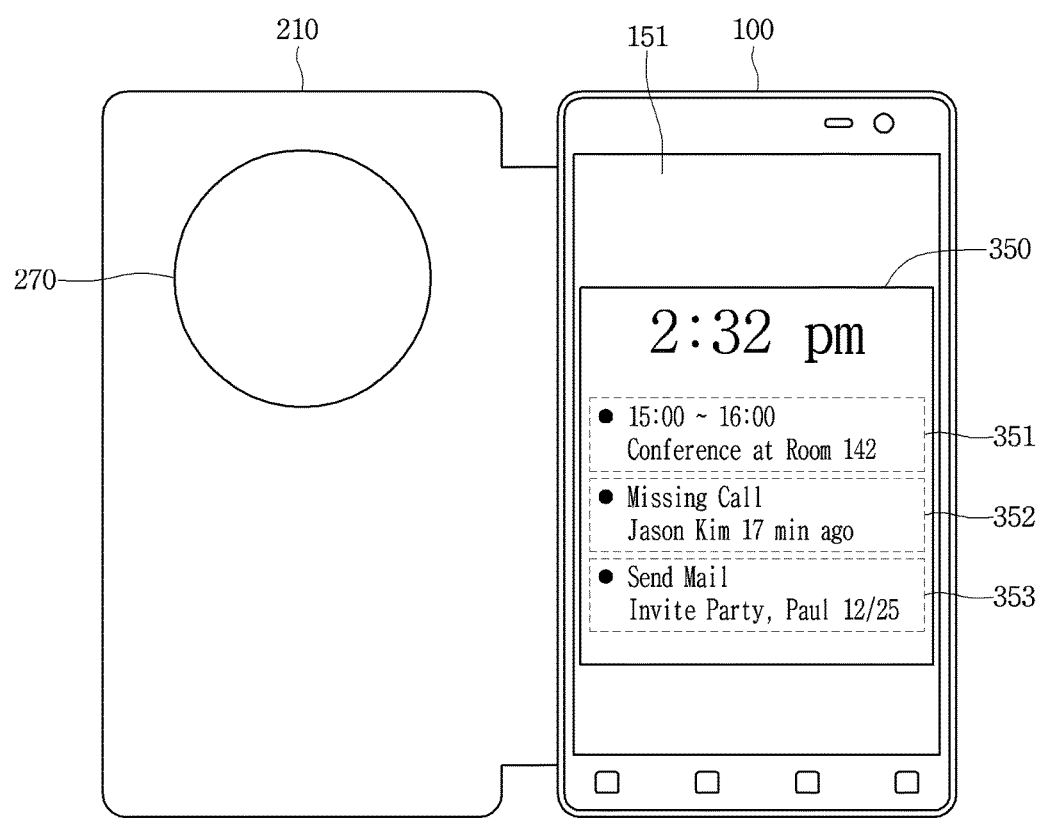
FIG. 21 is a view illustrating a second window display depending on a third operation of a terminal according to an embodiment of the present invention.

FIG. 21 is a view illustrating a second window display depending on a third operation of a terminal according to an embodiment of the present invention.

Referring to FIG. 21, the control unit 180 may display on the display unit 151 a second window 350 for displaying at least one event relating to the current time in the second case state. For example, the control unit 180 may display on the second window 350 a first event 351 relating to a schedule for the conference at 15:00, a second event 352 relating to a missing call from Jason Kim, and a third event 353 relating to a to-do list for sending a party invitation mail to Paul, as at least one event relating to 2:32 pm that is the current time.

Moreover, when a user input for the second window 350 displayed on the display unit 151 is obtained, the control unit 180 may execute an operation corresponding to the obtained user input.

This will be described with reference to FIGS. 22 to 24.

Figure 22:
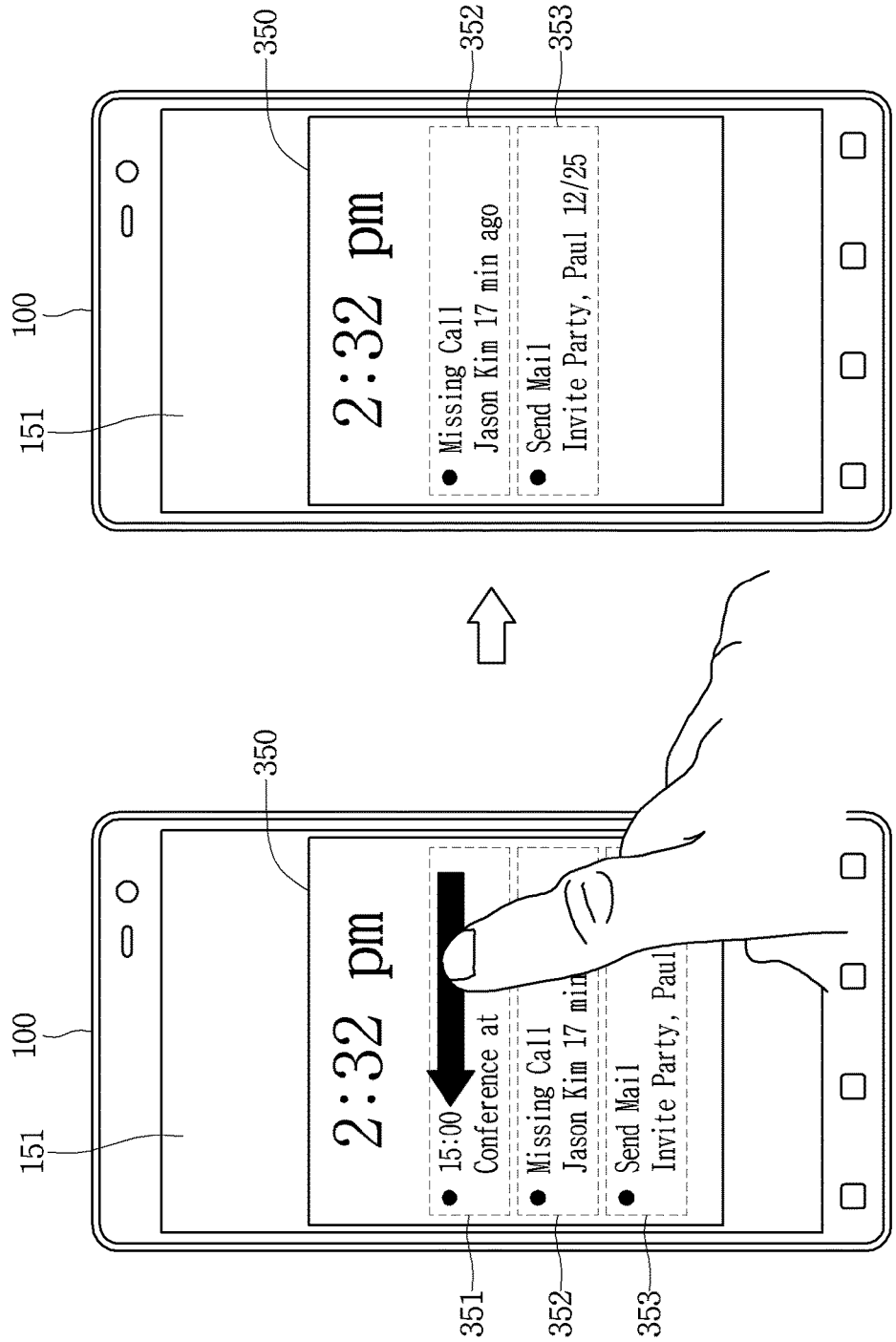
FIG. 22 is a view illustrating an editing operation on a second window according to an embodiment of the present invention.

FIG. 22 is a view illustrating an editing operation on a second window according to an embodiment of the present invention.

Referring to FIG. 22, the control unit 180 may obtain a user input for swiping an area corresponding to a first event 351 to the left direction among a plurality of events, for example, first to third event 351, 352, and 353, included in a second window 350 displayed on a display unit 151. Accordingly, the control unit 180 may delete the first event 351 from the displayed second window 350. Thus, the control unit 180 may display the second event 352 and the third event 353 on the displayed second window 350.

Figure 23:
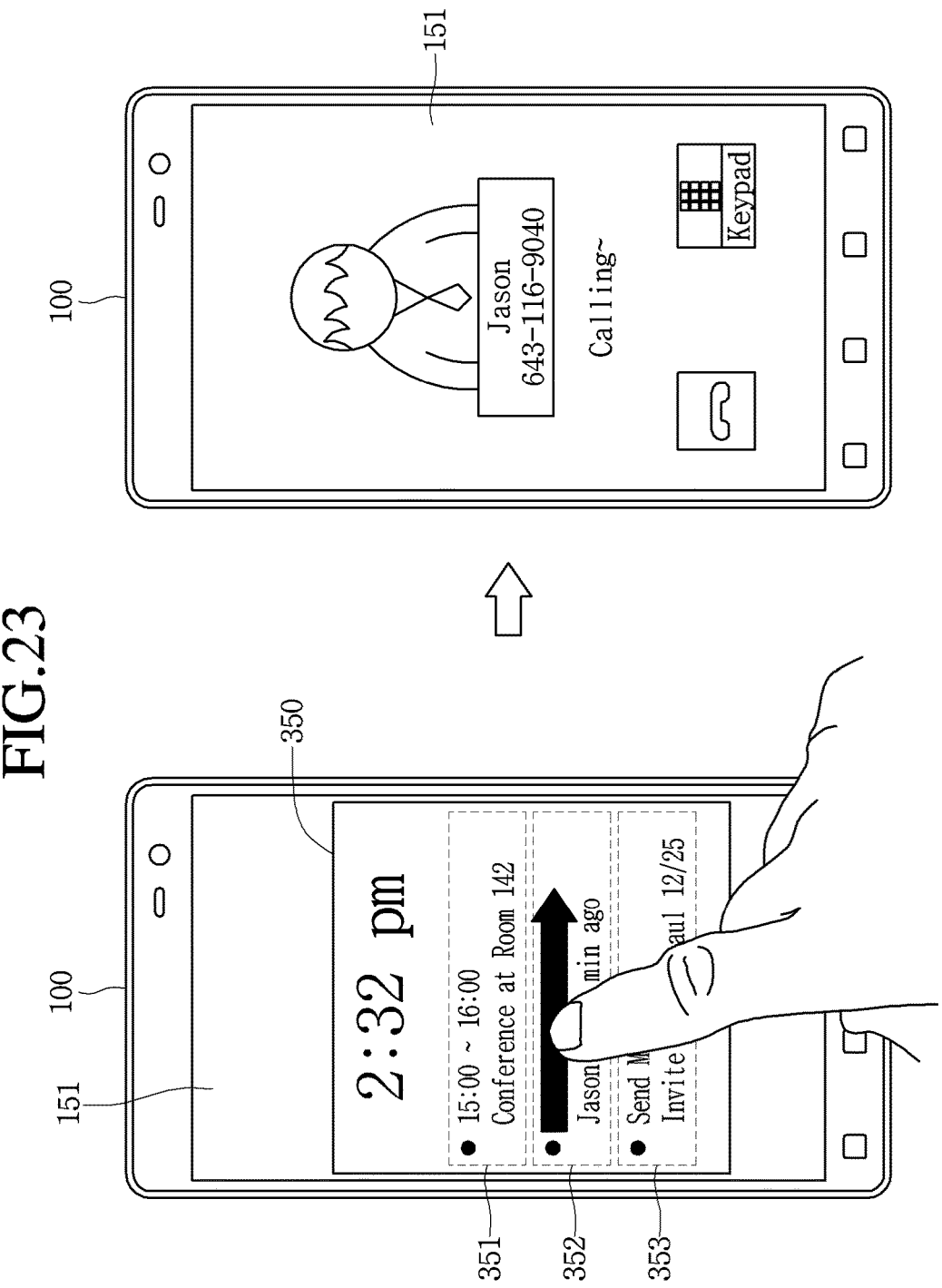
FIG. 23 is a view illustrating an event execution operation depending on a second window according to an embodiment of the present invention.

FIG. 23 is a view illustrating an event execution operation depending on a second window according to an embodiment of the present invention.

Referring to FIG. 23, the control unit 180 may obtain a user input for swiping an area corresponding to a second event 352 to the right direction among a plurality of events, for example, first to third event 351, 352, and 353, included in a second window 350 displayed on a display unit 151. Accordingly, the control unit 180 may perform an operation corresponding to the second event 352. Accordingly, the control unit 180 may send a call to the other party corresponding to a missed call, that is, the second event 352.

Figure 24:
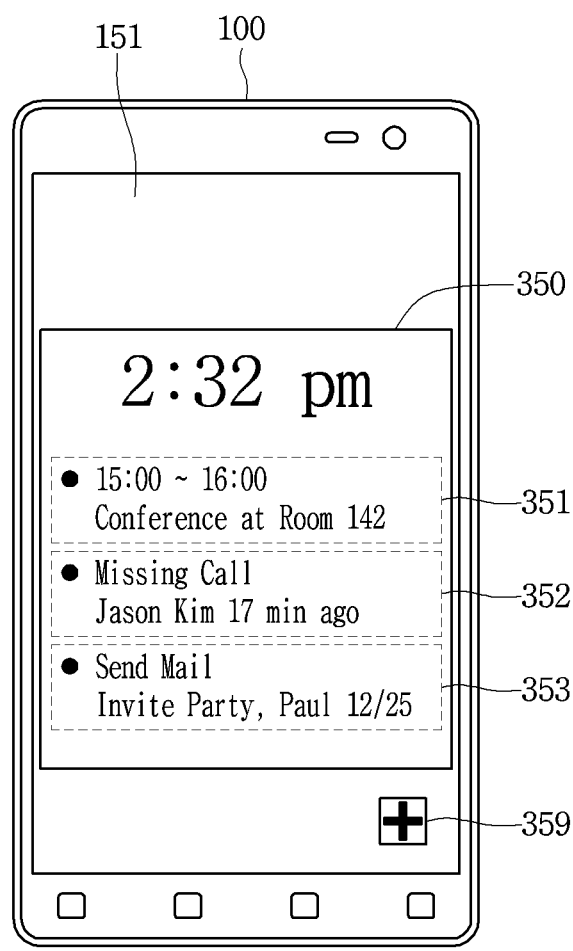
FIG. 24 is a view illustrating an event adding operation on a second window according to an embodiment of the present invention.

FIG. 24 is a view illustrating an event adding operation on a second window according to an embodiment of the present invention.

Referring to FIG. 24, the control unit 180 may display a second window 350 and an event adding icon 359 on a display unit 151. When a user input for the event adding icon 359 is obtained, the control unit 180 may obtain a user input for adding an event to be displayed on the second window 350. Then, the control unit 180 may display an added event on the second window 350.

In addition to the above description, the control unit 180 may edit the display order of a plurality of events included in the second window 350 on the basis of a user input on the second window 350. Moreover, the control unit 180 may change font sizes, fonts, and colors of a plurality of events displayed on the second window 350 according to a user setting.

Description for the above-mentioned third operation is not limited to the above. Accordingly, various operations may be set according to a user's or designer's selection.

FIG. 15 is referenced again.

When the detected case state is the third case state in operation S234, the control unit 180 performs a predetermined fourth operation in operation S254.

When it is determined that a state of the terminal case 200 coupled with the terminal 100 changes from the first case state to the third case state on the basis of a sensing value of the sensing unit 140, the control unit 180 may perform a preset fourth operation. Various operations may be set in the preset fourth operation according to a user's or designer's setting.

In an embodiment, the fourth operation may be an operation for displaying a basic screen of the terminal 100. Accordingly, the control unit 180 may perform an operation for displaying the basic screen of the terminal 100 on the display unit 151, as the predetermined fourth operation. Herein, the basic screen of the terminal 100 may be a home screen.

In another embodiment, the fourth operation may be an operation for displaying a screen according to an operation that the terminal 100 performed previously. Herein, the operation that the terminal 100 performed previously may be an operation that is performed in a state of the terminal 100, for example, the second case state or the third case state before the first case state. Accordingly, the control unit 180 may perform an operation for displaying a screen according to an operation that the terminal 100 performed previously on the display unit 151. For example, while displaying a webpage on the display unit 151 in the third case state before the first case state of operation S211, the control unit 180 may perform an operation for displaying the webpage on the display unit 151 as the predetermined fourth operation.

Description for the above-mentioned fourth operation is not limited to the above. Accordingly, various operations may be set according to a user's or designer's selection.

Moreover, when a state of the terminal case 200 coupled with the terminal 100 changes from the second case state or the third case state to another case state, the terminal 100 may perform a preset fifth operation. This will be described with reference to FIGS. 25 to 27.

Figure 25:
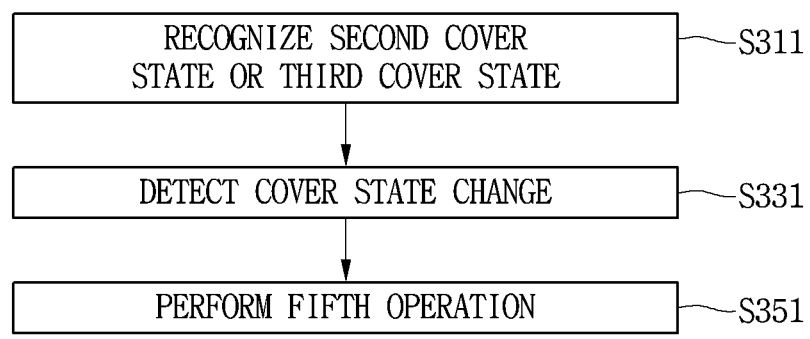
FIG. 25 is a flowchart illustrating a terminal operation according to a second embodiment of the present invention.

FIG. 25 is a flowchart illustrating a terminal operation according to a second embodiment of the present invention.

Referring to FIG. 25, the control unit 180 of the terminal 100 recognizes a state of the terminal case 200 coupled with the terminal 100 as the second case state or the third case state in operation S311.

The control unit 180 may recognize a state of the terminal case 200 coupled with the terminal 100 on the basis of a sensing value of the sensing unit 140. In more detail, the control unit 180 may recognize the position of the case front part 210 on the basis of a sensing value of at least one of the magnetic sensor 145 and the proximity sensor. Accordingly, the control unit 180 may recognize whether the terminal case 200 coupled with the terminal 100 is in the second case state or the third case state. Since this is described above, detailed description will be omitted.

The control unit 180 may detect a state change of the terminal case 200 in the second case state or the third case state.

The control unit 180 may recognize that a state of the terminal case 200 coupled with the terminal 100 changes from the second case state or the third case state to another case state on the basis of a sensing value of the sensing unit 140. For example, the control unit 180 may recognize whether a state of the terminal case 200 changes from the third case state to the second case state, from the third case state to the first case state, and from the second case state to the first case state, or from the second case state to the third case state on the basis of a sensing value of the sensing unit 140. Accordingly, the control unit 180 may detect that the terminal case 200 coupled with the terminal 100 changes from the second case state or the third case state to another case state.

When a case state change is detected, the control unit 180 performs a predetermined fifth operation in operation S351.

When it is determined that a state of the terminal case 200 coupled with the terminal 100 changes from the second case state or the third case state to another case state on the basis of a sensing value of the sensing unit 140, the control unit 180 may perform a preset fifth operation. Various operations may be set in the preset fifth operation according to a user's or designer's setting.

In an embodiment, the fifth operation may be an operation for displaying a third window 370 that is a summary information window for summary information including at least one of a usage history or unchecked event of the terminal 100. Herein, the usage history of the terminal 100 may include an operation history of the terminal 100 after a case state of the terminal 100 changes from the first case state to the second case state or the third case state. This will be described with reference to FIG. 26.

Figure 26:
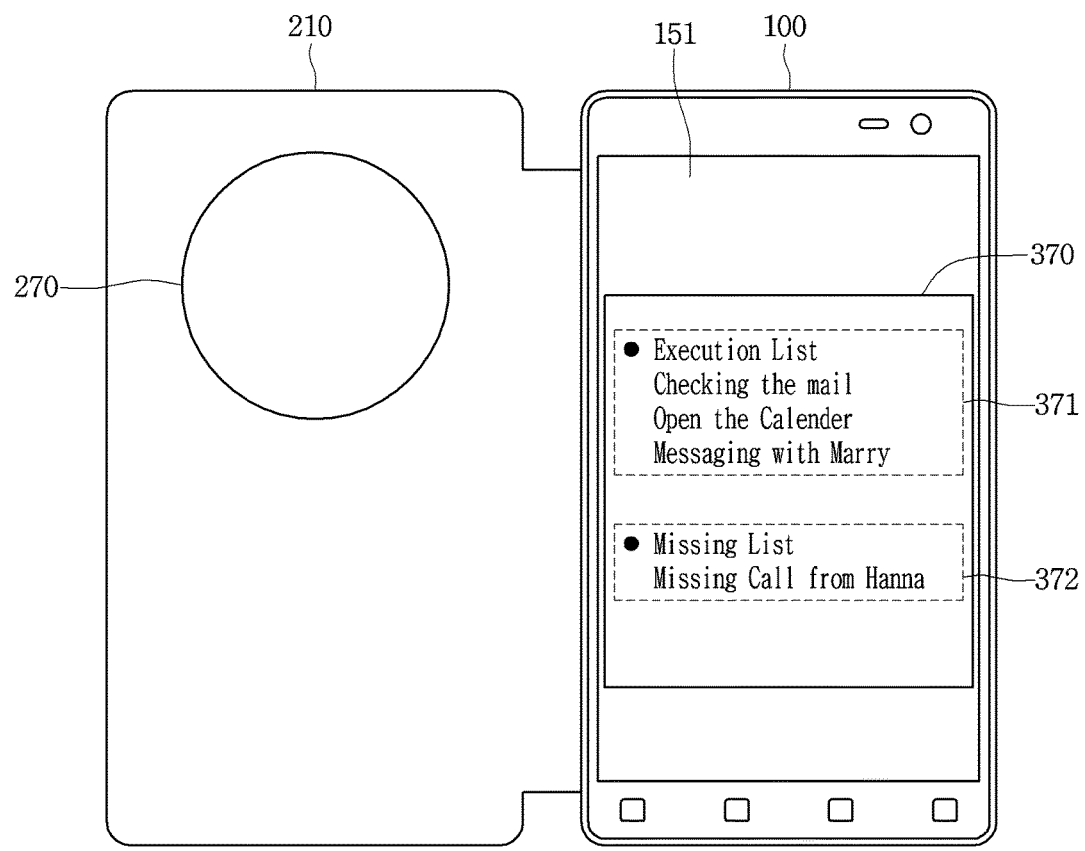
FIG. 26 is a view illustrating a third window display according to an embodiment of the present invention.

FIG. 26 is a view illustrating a third window display according to an embodiment of the present invention.

Referring to FIG. 26, the control unit 180 may display on the display unit 151 a third window 370 for summary information including a usage history 371 and unchecked event 372 of the terminal 100. In more detail, the control unit 180 may display <checking the mail>, <open the calendar>, and <messaging with Marry>, on a partial area of the third window 370, as the usage history 371 of the terminal 100 after a case state of the terminal 100 changes from the first case state to the second case state or from the first case state to the third case state. Additionally, the control unit 180 may display <missing call from Hanna>, that is, an unchecked event 372, on another partial area of the third window 370.

Moreover, when a user input for the third window 370 displayed on the display unit 151 is obtained, the control unit 180 may perform an operation corresponding to the obtained user input.

This will be described with reference to FIG. 27.

Figure 27:
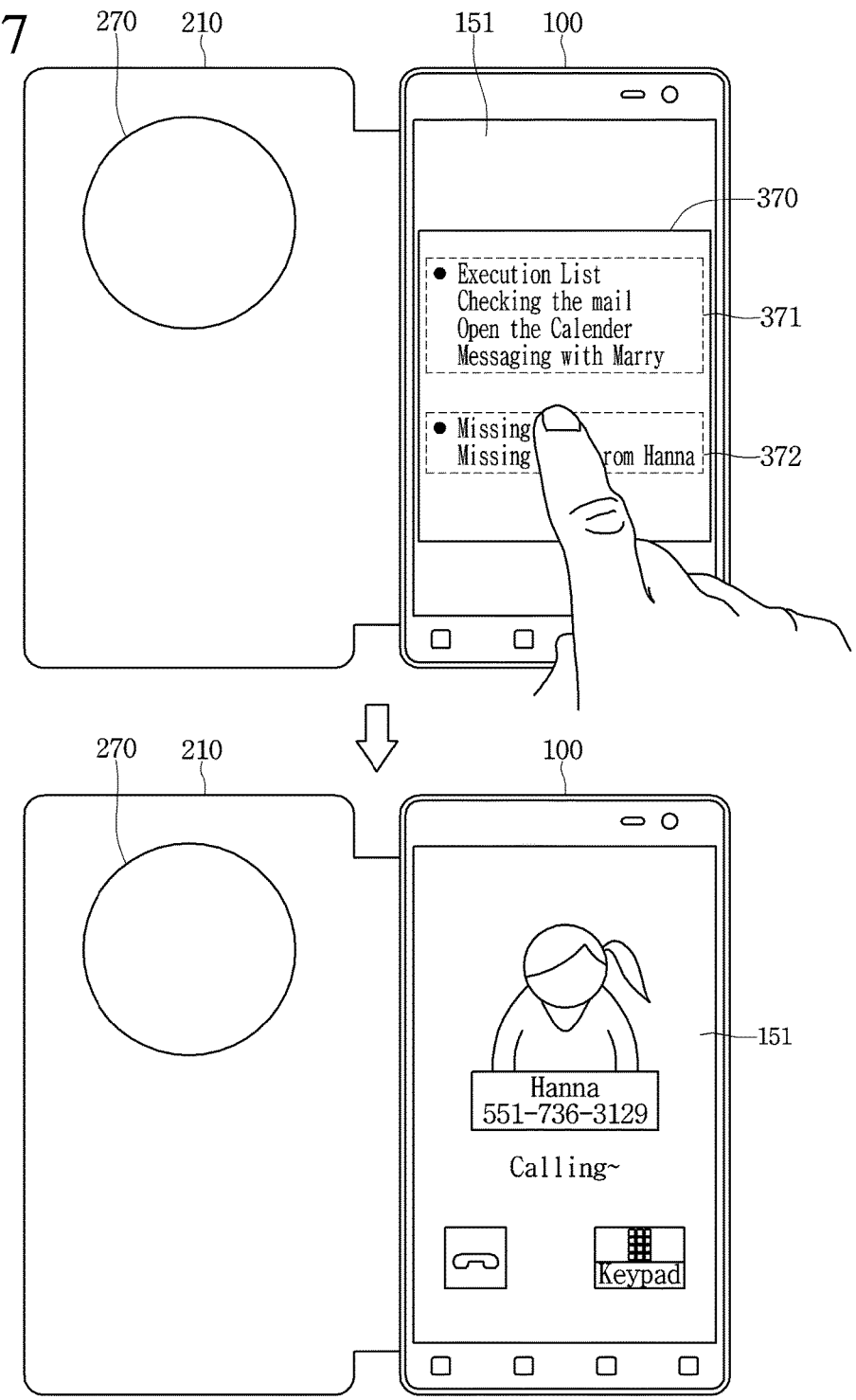
FIG. 27 is a view illustrating an event execution operation depending on a third window according to an embodiment of the present invention.

FIG. 27 is a view illustrating an event execution operation depending on a third window according to an embodiment of the present invention.

Referring to FIG. 27, the control unit 180 may obtain a user input for touching an area corresponding to one of a usage history 371 and an unchecked event 372 included in a third window 370 displayed on a display unit 151. For example, the control unit 180 may obtain a user input for touching an area corresponding to <missing call from Hanna> that is one event included in the usage history 371 among the usage history 371 and the unchecked event 372 included in the third window 370. Accordingly, the control unit 180 may place a call to Hanna, as an event corresponding to a touch event.

Figure 28:
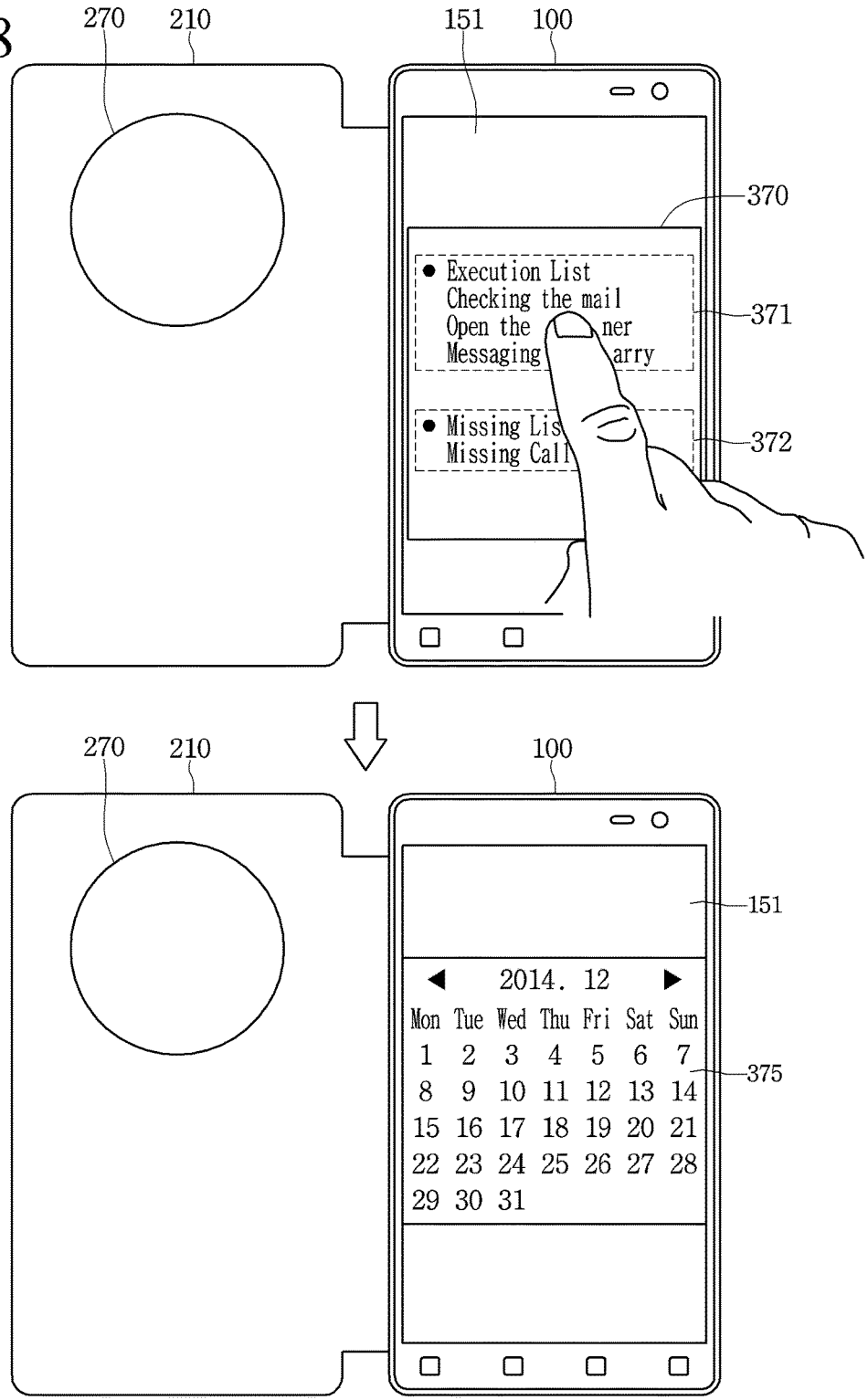
FIG. 28 is a view illustrating an event execution operation depending on a third window according to another embodiment of the present invention.

FIG. 28 is a view illustrating an event execution operation depending on a third window according to another embodiment of the present invention.

Referring to FIG. 28, the control unit 180 may obtain a user input for touching an area corresponding to one of a usage history 371 and an unchecked event 372 included in a third window 370 displayed on a display unit 151. For example, the control unit 180 may obtain a user input for touching an area corresponding to <open the calendar> that is the unchecked event 371 among the usage history 371 and the unchecked event 372 included in the third window 370. Accordingly, the control unit 180 may display a calendar window 375 on the display unit 151 as an event corresponding to a touch event.

Description for the above-mentioned fifth operation is not limited to the above. Accordingly, various operations may be set according to a user's or designer's selection.

Moreover, the terminal 100 may measure a distance between the front of the terminal 100 and the case front part 210 of the terminal case 200 coupled with the terminal 100. The control unit 180 may measure a hold time td that a measured distance d stays between a first reference distance d1 and a second reference distance d2. Then, the control unit 180 may perform an operation corresponding to the measured hold time td.

This will be described with reference to FIGS. 29 to 39.

Figure 29:
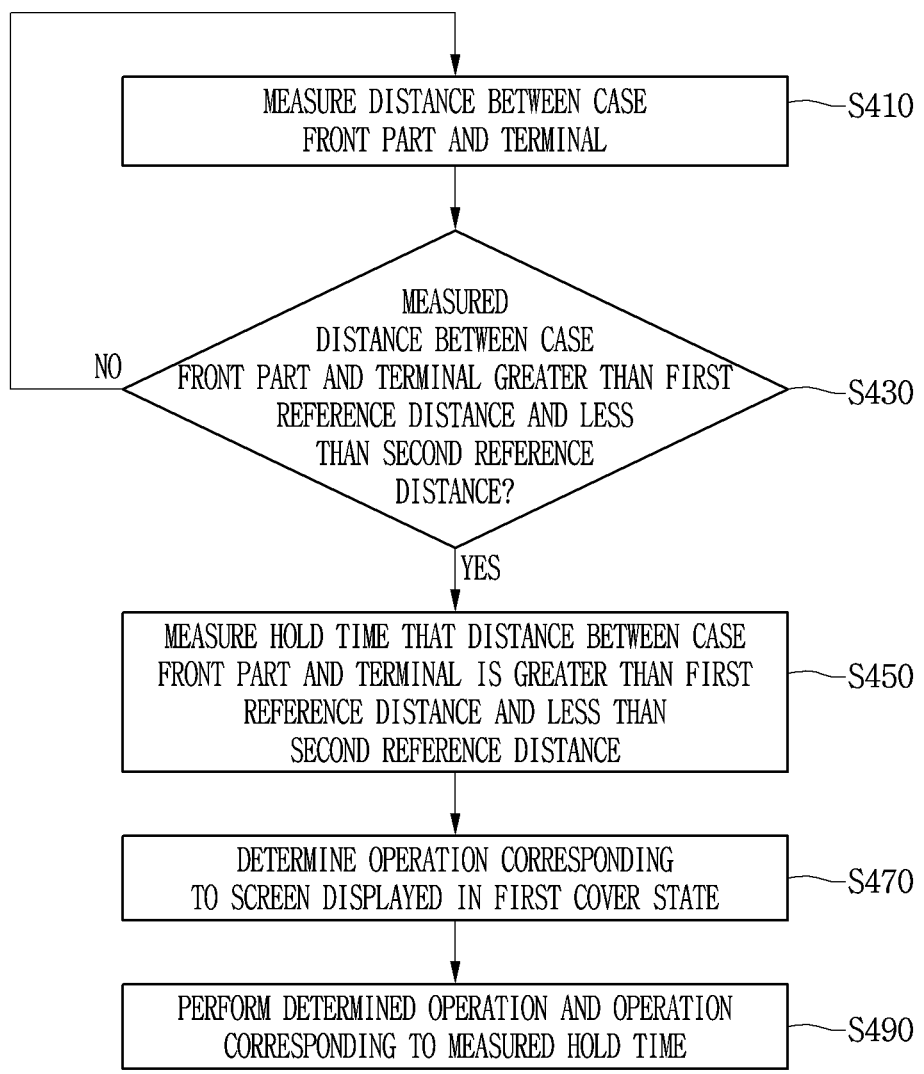
FIG. 29 is a flowchart illustrating a terminal operation according to a third embodiment of the present invention.

FIG. 29 is a flowchart illustrating a terminal operation according to a third embodiment of the present invention.

Referring to FIG. 29, the control unit 180 of the terminal 100 measures a distance d between the case front part 210 of the terminal case 200 coupled with the terminal 100 and the front of the terminal 100 in operation S410.

The control unit 180 may measure the distance d between the case front part 210 and the front of the terminal 100 on the basis of a sensing value of the sensing unit 140. In more detail, the control unit 180 may measure the measurement distance d on the basis of a sensing value of at least one of the magnetic sensor 145 and the proximity sensor included in the sensing unit 140.

According to an embodiment, the magnetic sensor 145 may detect at least one of the size of magnetic field or the direction of magnetic field corresponding to the front magnetic material 231 included in the case front part 210. The control unit 180 may compare at least one of the size of magnetic field or the direction of magnetic field corresponding to the detected front magnetic material 231 with a reference value and may measure a distance d between the case front part 210 and the front of the terminal 100 on the basis of a comparison result.

In another embodiment, the front sensor 148 included in the proximity sensor may sense the front direction of the terminal 100. The front sensor 148 may sense a distance to the case front part 210. The control unit 180 may measure a distance d between the case front part 210 and the front of the terminal 100 on the basis of a sensing value of the sensing unit 140.

The control unit 180 may determine whether the measurement distance d between the measured case front part 210 and the front of the terminal 100 is greater than a first reference distance d1 and less than a second reference distance d2 in operation S430.

This will be described with reference to FIG. 30.

Figure 30:
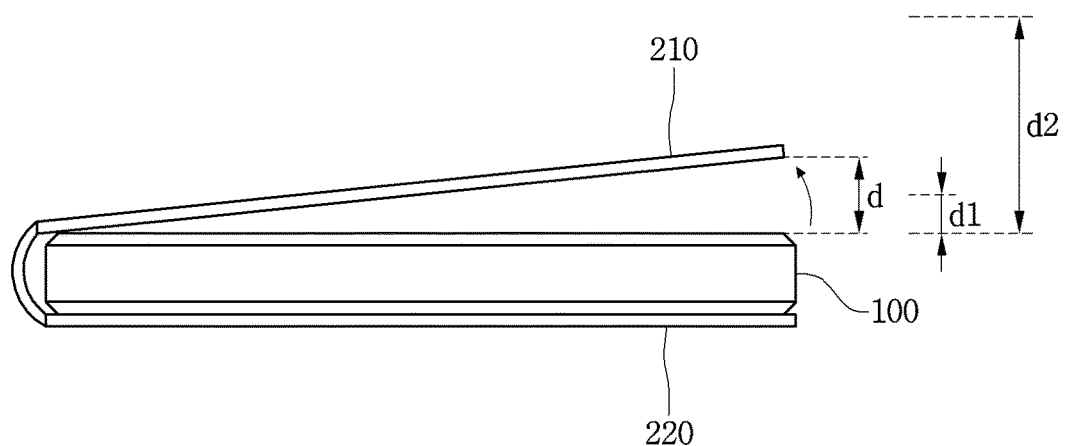
FIG. 30 is a view illustrating a measurement distance, a first reference distance, and a second reference distance according to an embodiment of the present invention.

FIG. 30 is a view illustrating a measurement distance, a first reference distance, and a second reference distance according to an embodiment of the present invention.

Referring to FIG. 30, the control unit 180 may determine whether a measurement distance d is greater than a predetermined first reference distance d1 and less than a second reference distance d2. Herein, the first reference distance d1 is shorter than the second reference distance d2. In more detail, the control unit 180 may determine whether a distance value for the measurement distance d is greater than a distance value for the first reference distance d1. Then, the control unit 180 may determine whether a distance value for the measurement distance d is less than a distance value for the second reference distance d2. Accordingly, the control unit 180 may determine whether the measurement distance d is greater than the predetermined first reference distance d1 and less than the second reference distance d2 on the basis of a determination result.

The first reference distance d1 and the second reference distance d2 may be set according to a user's or designer's selection.

FIG. 29 is referenced again.

The control unit 180 may measure a hold time td that the measurement distance d is greater than the first reference distance d1 and less than the second reference distance d2 in operation S450.

Herein, the hold time td may mean a time during which the measurement distance d is maintained between the first reference distance d1 and the second reference distance d2. In an embodiment, the control unit 180 may measure a hold time td from a time t1 at which the measurement distance d is greater than the first reference distance d1 to a time t2 at which the measurement distance d is less than the second reference distance d2. As an embodiment, the control unit 180 may measure a hold time td from a time t1 at which the measurement distance d is greater than the first reference distance d1 to a time t3 at which the measurement distance d is greater than the second reference distance d2.

The control unit 180 may determine an operation of the terminal 100 corresponding to a screen displayed on the display unit 151 in the first case state in operation S470.

When a state of the terminal case 200 coupled with the terminal 100 is the first case state, the control unit 180 may determine an operation of the terminal 100 corresponding to a screen displayed on the display unit 151.

In more detail, the control unit 180 may turn on the display unit 151 in the first case state and may display a screen relating to an operation of the terminal 100 on the display unit 151. For example, the control unit 180 may display on the display unit 151 a screen relating to an operation for at least one of video playback, music playback, message reception, current time display, or weather display in the first case state. Since an operation corresponding to a screen displayed on the display unit 151 in the first case state is described above, detailed description is omitted.

Accordingly, the control unit 180 may determine an operation corresponding to a screen displayed on the display unit 151 in the first case state. For example, when a screen relating to a message reception is displayed on the display unit 151 in the first case state, the control unit 180 may determine that an operation of the terminal 100 is an operation relating to a message. For another example, when a screen relating to a weather display is displayed on the display unit 151 in the first case state, the control unit 180 may determine that an operation of the terminal 100 is an operation relating to weather. In such a way, the control unit 180 may determine an operation corresponding to a screen displayed on the display unit 151 in the first case state.

The control unit 180 performs a determined operation of the terminal 100 and an operation corresponding to a measured hold time td in operation S490.

The control unit 180 may perform an operation of the terminal 100 determined in operation S470 and an operation corresponding to a measured hold time td, and the determined operation of the terminal 100 and the operation corresponding to the measured hold time td may be predetermined operations.

This will be described with reference to FIGS. 31 to 39.

Figure 31:
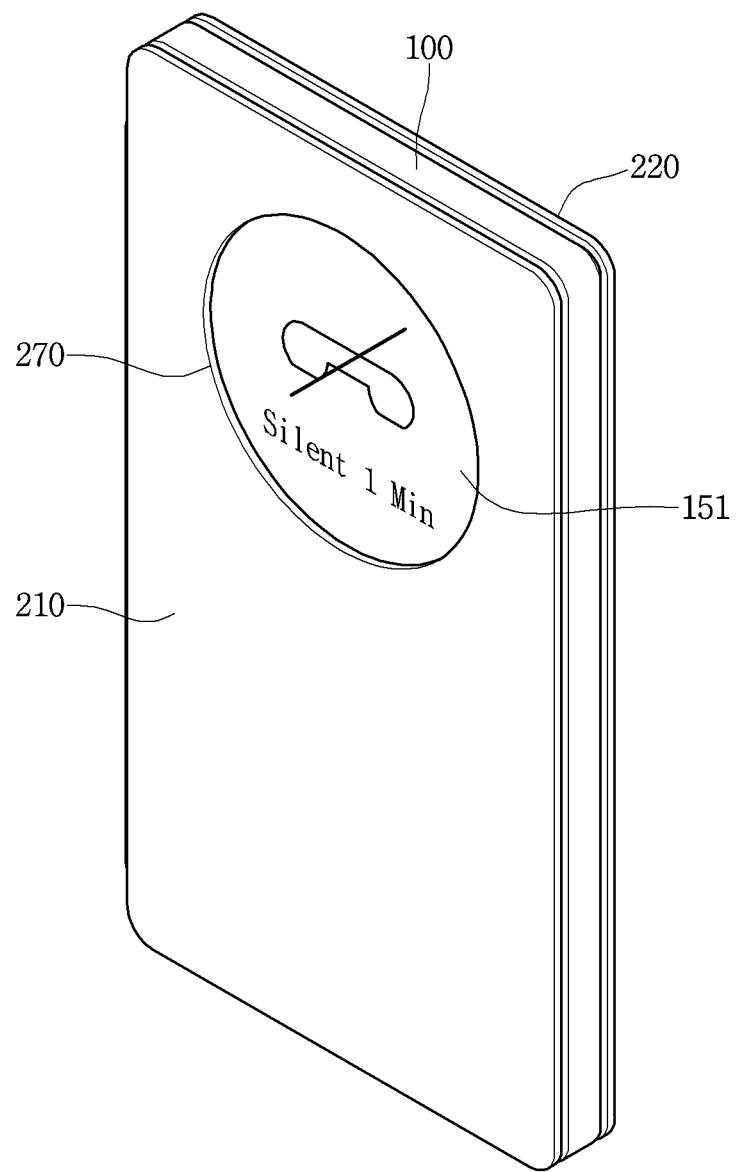
FIGS. 31 and 32 are views illustrating an operation of a terminal corresponding to a call reception screen according to an embodiment of the present invention.
Figure 32:
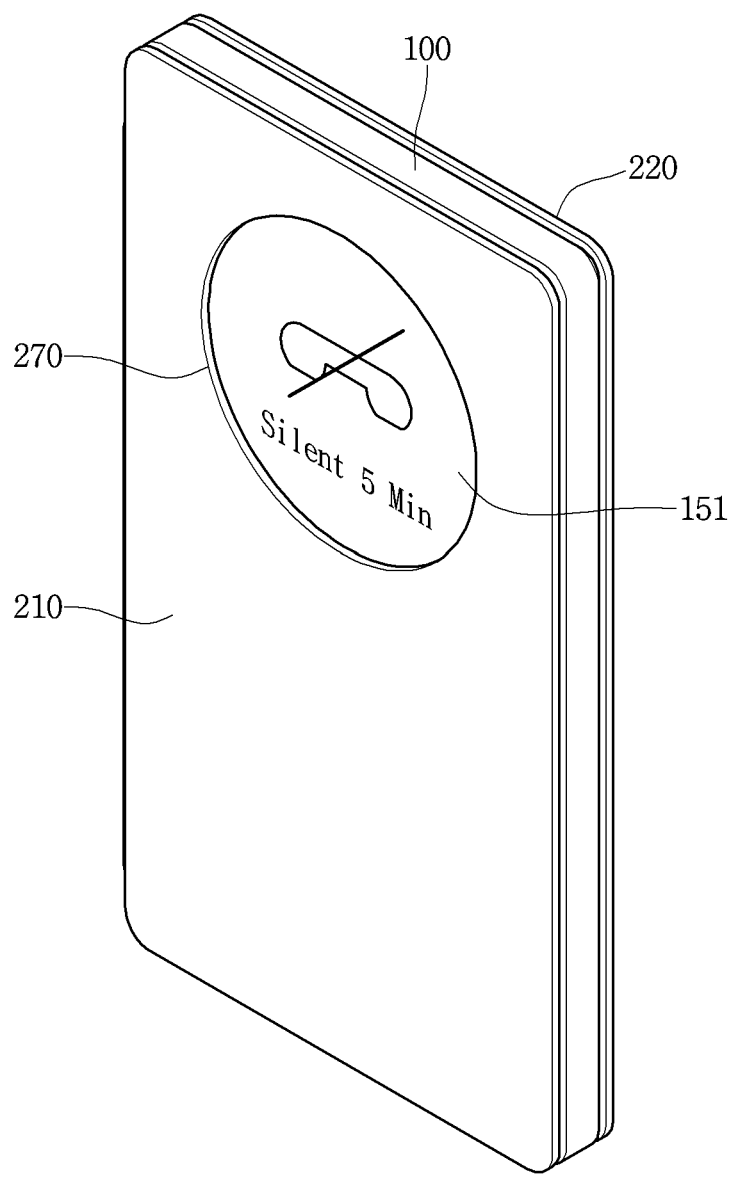

FIGS. 31 and 32 are views illustrating an operation of a terminal corresponding to a call reception screen according to an embodiment of the present invention.

When a determined operation of the terminal 100 is a call reception operation, the control unit 180 performs an operation relating to a call reception as the determined operation of the terminal 100 and the operation corresponding to the measured hold time td. In an embodiment, as shown in FIG. 31, when the determined operation of the terminal 100 is a call reception operation and the measured hold time td is a first time, the control unit 180 may operate in a silent bell state for 1 min. Accordingly, the control unit 180 may display a silent bell and "1 min" (that is, a silent operation time) on the display unit 151. In another embodiment, as shown in FIG. 32, when the determined operation of the terminal 100 is a call reception operation and the measured hold time td is a fifth time, the control unit 180 may operate in a silent bell state for 5 min. Accordingly, the control unit 180 may display a silent bell and "5 min" (that is, a silent operation time) on the display unit 151.

Figure 33:
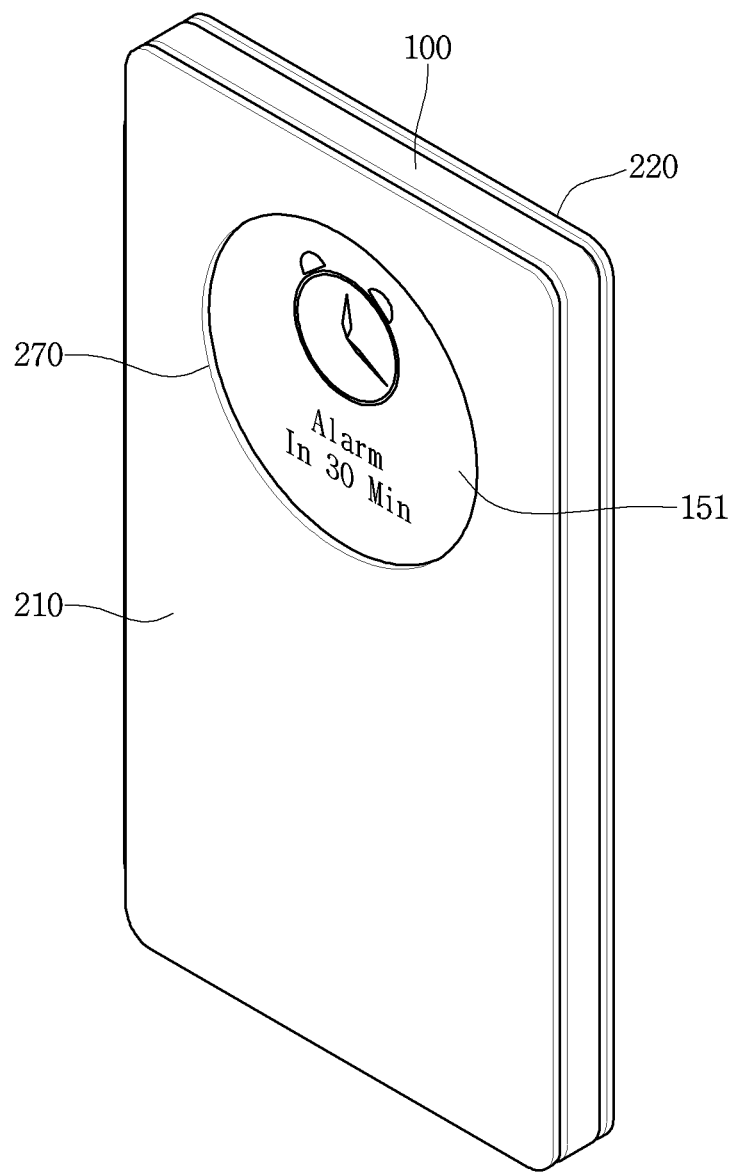
FIGS. 33 and 34 are views illustrating an operation of a terminal corresponding to a watch screen according to an embodiment of the present invention.
Figure 34:
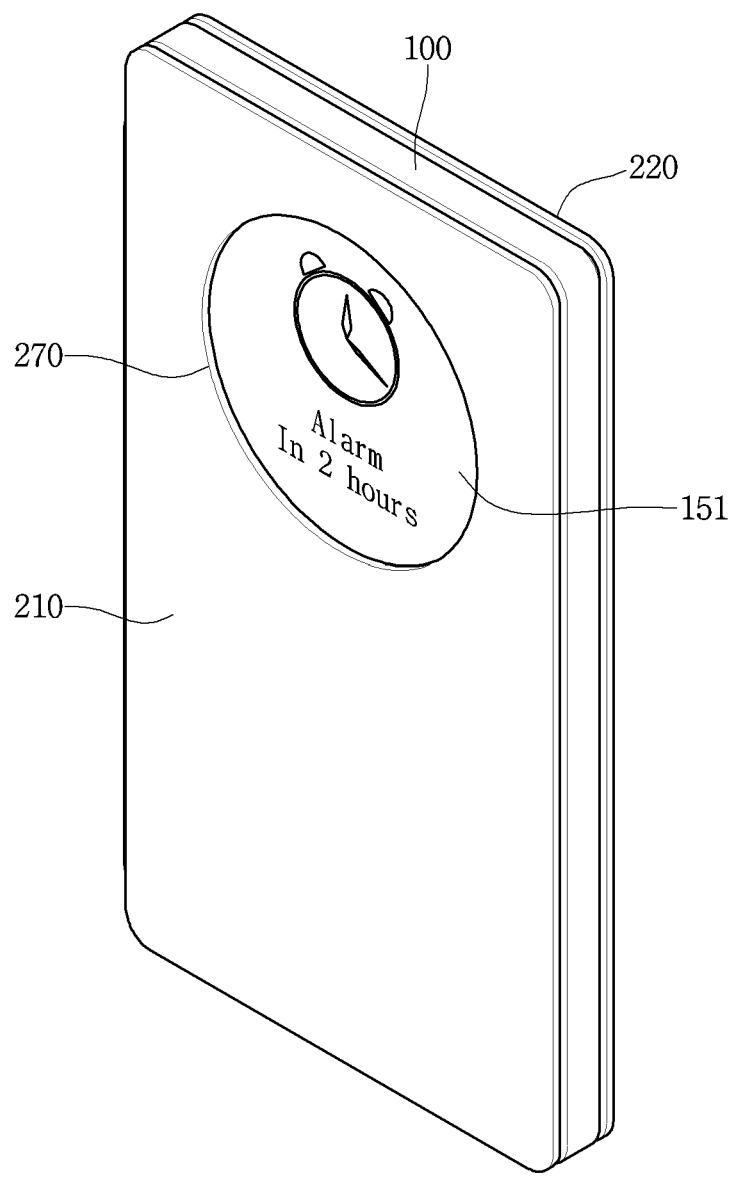

FIGS. 33 and 34 are views illustrating an operation of a terminal corresponding to a watch screen according to an embodiment of the present invention.

The control unit 180 may display a watch screen representing the current time on the display unit 151 in the first case state and may perform a time related operation with an operation of the terminal 100 corresponding to the displayed watch screen as the determined operation of the terminal 100 and the operation corresponding to the measured hold time td. In an embodiment, as shown in FIG. 33, when the determined operation of the terminal 100 is a watch display operation and the measured hold time td is a third time, the control unit 180 may set an alarm to alarm after 30 minutes. Accordingly, the control unit 180 may display an alarm after 30 minutes on the display unit 151 and may perform an alarm operation after set 30 minutes. In another embodiment, as shown in FIG. 34, when the determined operation of the terminal 100 is a watch display operation and the measured hold time td is a seventh time, the control unit 180 may set an alarm to alarm after 2 hours. Accordingly, the control unit 180 may display an alarm after 2 hours on the display unit 151 and may perform an alarm operation after set 2 hours.

Figure 35:
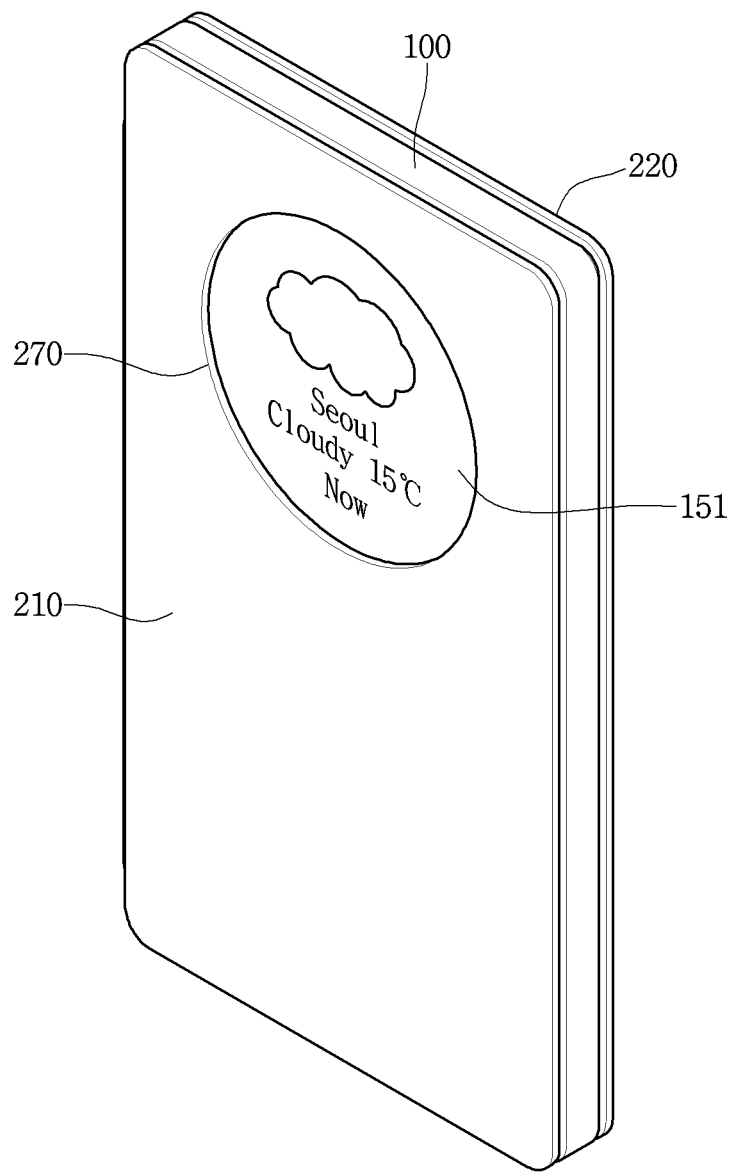
FIGS. 35-37 are views illustrating an operation of a terminal corresponding to a weather screen according to an embodiment of the present invention.
Figure 36:
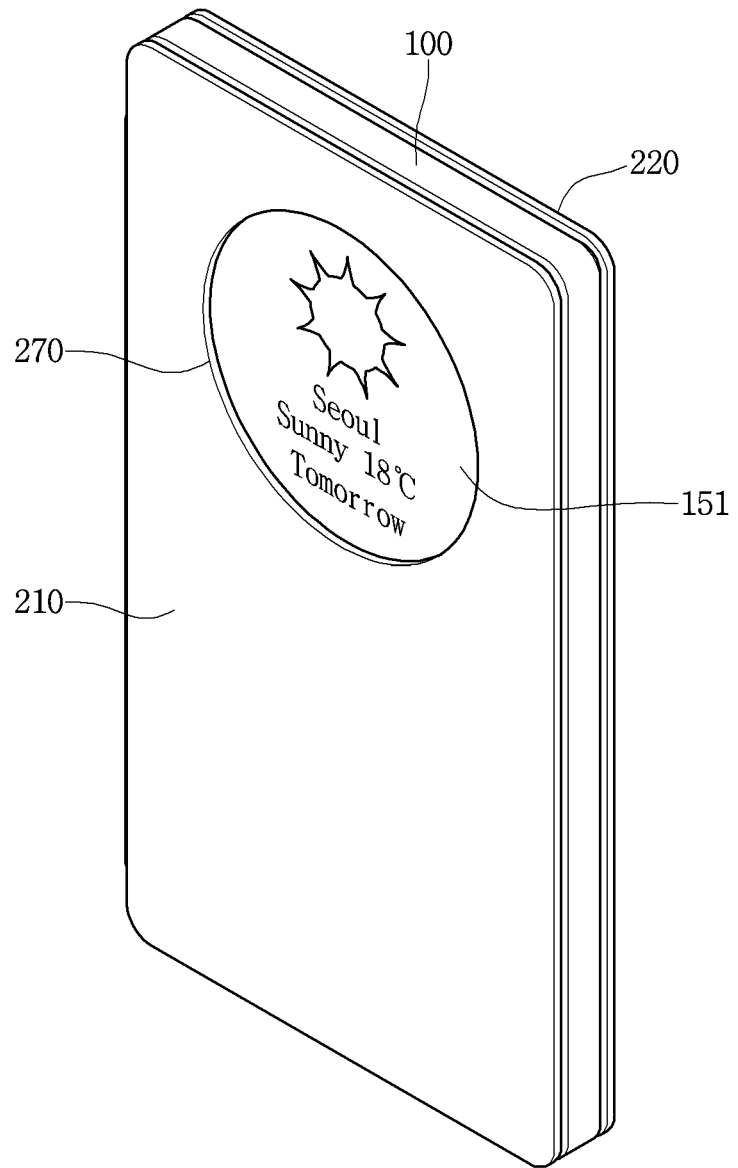
Figure 37:
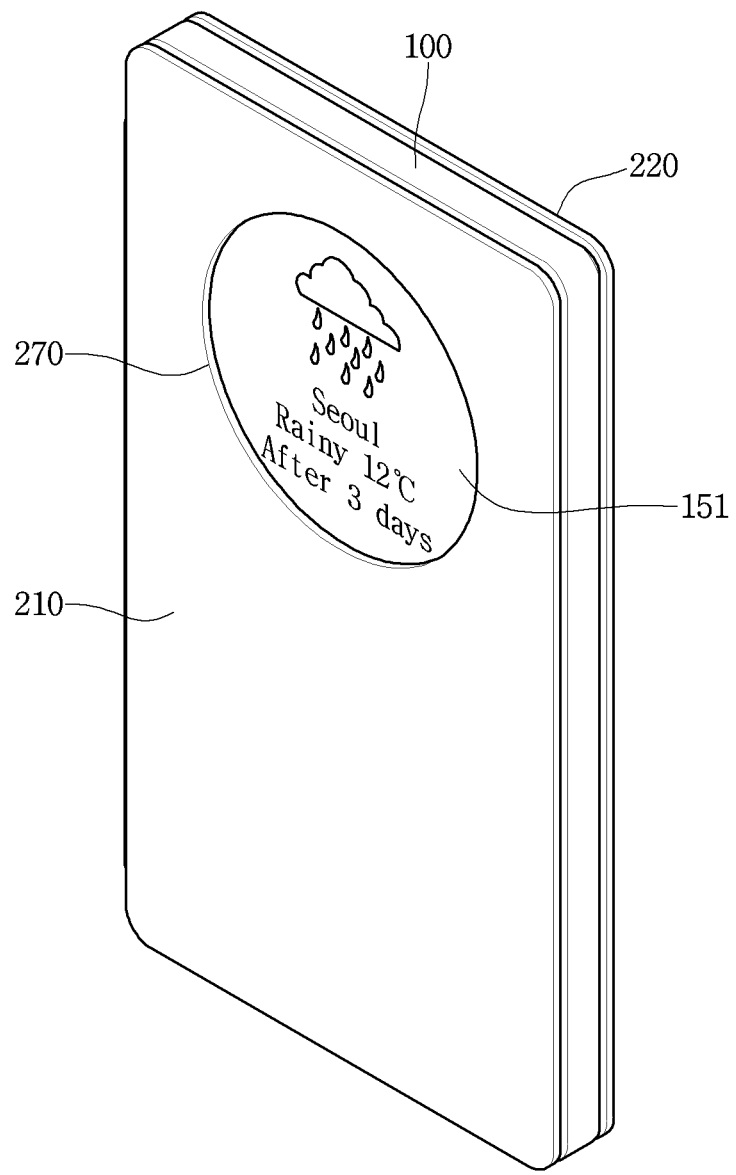

FIGS. 35-37 are views illustrating an operation of a terminal corresponding to a weather screen according to an embodiment of the present invention.

Referring to FIG. 35, the control unit 180 may display a weather screen representing the current weather on the display unit 151 in the first case state and may perform a weather related operation with an operation of the terminal 100 corresponding to the displayed weather screen as the determined operation of the terminal 100 and the operation corresponding to the measured hold time td. In an embodiment, as shown in FIG. 36, when the determined operation of the terminal 100 is a weather display operation and the measured hold time td is a second time, the control unit 180 may display tomorrow's weather on the display unit 151. In another embodiment, as shown in FIG. 37, when the determined operation of the terminal 100 is a weather display operation and the measured hold time td is a sixth time, the control unit 180 may display weather in three days on the display unit 151.

In such a way, the terminal 100 may perform the determined operation of the terminal 100 and various operations corresponding to the measured hold time td. Accordingly, description for performing an operation of the terminal 100 and an operation corresponding to the measured hold time td is not limited to the above. Thus, an operation of the terminal 100 and an operation corresponding to the measured hold time td may be set variously according to a user's or designer's selection.

Moreover, in another embodiment, the control unit 180 may perform an operation for changing at least one of a screen size or a font size displayed on the display unit 151, as a determined operation of the terminal 100 and an operation corresponding to the measured hold time td. This will be described with reference to FIGS. 38 and 39.

Figure 38:
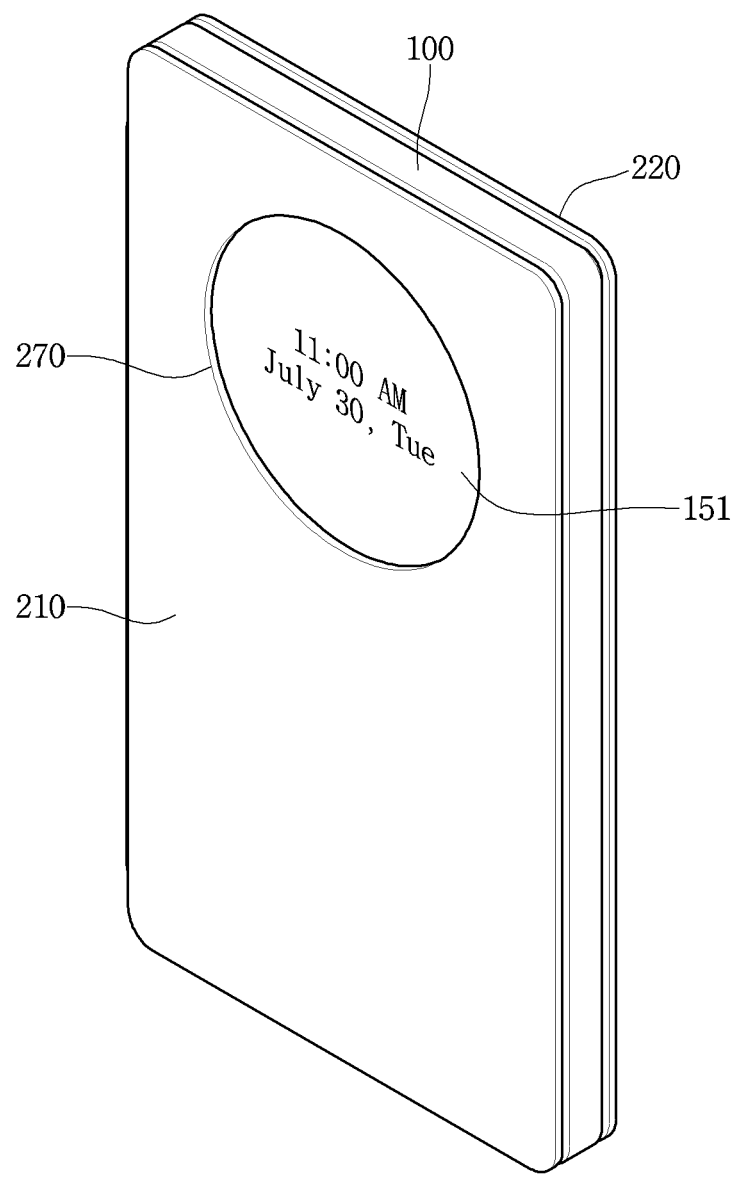
FIGS. 38 and 39 are views illustrating a font size change of a terminal according to an embodiment of the present invention.
Figure 39:
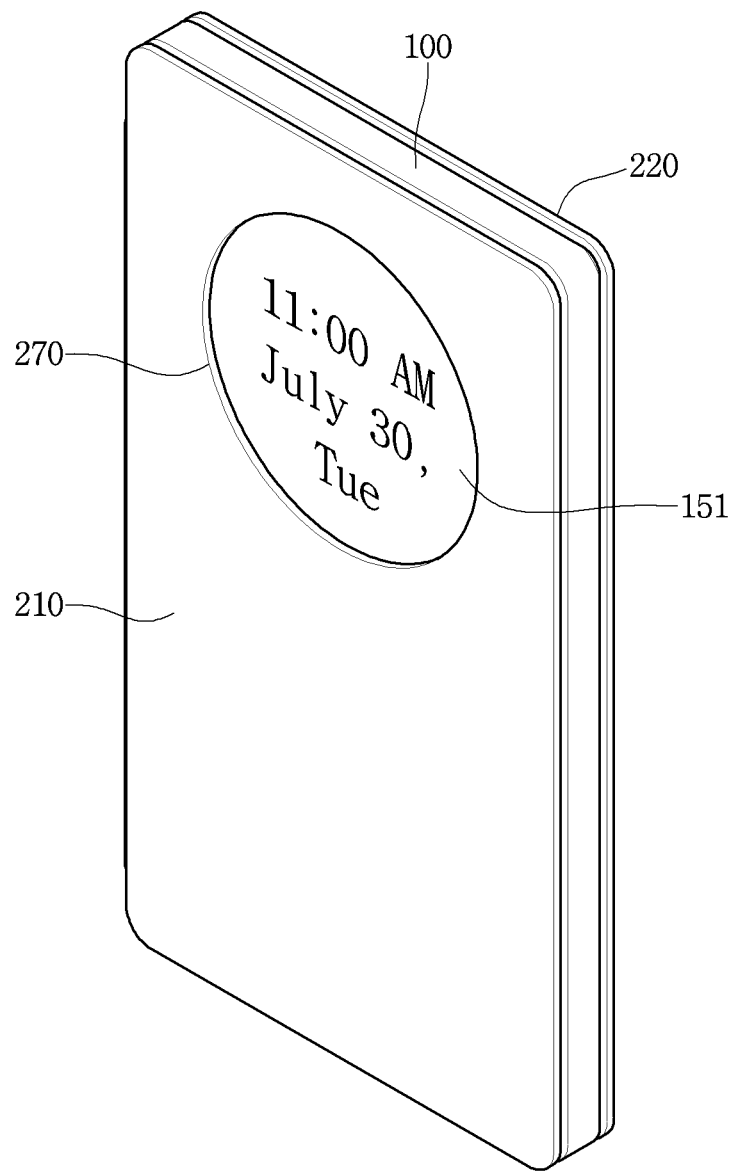

FIGS. 38 and 39 are views illustrating a font size change of a terminal according to an embodiment of the present invention.

Referring to FIG. 38, the control unit 180 may display a watch screen representing the current time on the display unit 151 in the first case state. Accordingly, the control unit 180 may display the current time, date, and day of the week on the display unit 151 in the first case state. Then, the control unit 180 may display the current time, date, and day of the week in a partial area of the display unit 151 corresponding to the front opening part 270 located at the case front part 210.

Moreover, the control unit 180 may perform an operation for changing a font size displayed on the display unit 151, as a determined operation of the terminal 100 and an operation corresponding to a measured hold time td. Accordingly, referring to FIG. 39, the control unit 180 may enlarge the font size on the current time, data, and day of the week displayed on the display unit 151 in correspondence to the measured hold time td.

In such a way, the control unit 180 may perform an operation for changing at least one of a screen size or a font size displayed on the display unit 151, as a determined operation of the terminal 100 and an operation corresponding to a measured hold time td.

In relation to a terminal and an operating method thereof according to an embodiment of the present invention, since a terminal performs various operations according to a case state of a terminal case coupled with the terminal, a user coupling a terminal case to a terminal may use the terminal more conveniently.

The invention can also be embodied as computer readable codes on a computer readable recording medium. The computer readable recording medium is any data storage device that can store data which can be thereafter read by a computer system. Examples of the computer readable recording medium include magnetic storage media (e.g., ROM, floppy disks, hard disks, etc.) and optical recording media (e.g., CD-ROMs, or DVDs) and carrier waves (e.g., transmission through the Internet). Additionally, the computer may include the control unit 180 of a terminal. Accordingly, the detailed description is not construed as being limited in all aspects and should be considered as illustrative. The scope of the invention should be determined by reasonable interpretation of the appended claims, and all modifications within equivalent ranges of the present invention are included in the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A terminal configured to be coupled with a case, the terminal comprising:
   a display;
   a sensing unit configured to sense a position of the case with respect to the terminal; and
   a control unit configured to:
   determine an operating state of the terminal;
   recognize a change of a state of the case based on the sensed position of the case; and
   perform an operation based on the determined operating state of the terminal and the recognized change of the state of the case,
   wherein the state of the case includes:
   a first case state in which a case front part of the case covers a front portion of the terminal or the case front part is in contact with the front portion of the terminal;
   a second case state in which the case front part does not cover the front portion and a back portion of the terminal or the case front part is not in contact with the front portion and the back portion of the terminal; and
   a third case state in which the case front part covers the back portion of the terminal or the case front part is in contact with the back portion of the terminal,
   wherein the change of the state of the case includes a change from the first case state to the second case state, a change from the first case state to the third case state, and a change from the second case state or the third case state to another case state,
   wherein the determining of the operating state of the terminal includes determining whether the display is in an on or off state, and
   wherein the performed operation is different according to the determined operating state of the terminal and the change of the state of the case.

2. The terminal according to claim 1, wherein the control unit is further configured to:
   determine at least one operation of the terminal corresponding to a screen displayed on the display;
   recognize the change from the first case state to the second case state; and
   perform a first operation among a plurality of operations that are performable when the screen is displayed on the display in the second case state, and
   wherein less than a preset number of user inputs is receivable when the first operation is performed.

3. The terminal according to claim 1, wherein the control unit is further configured to:
   determine at least one operation of the terminal corresponding to a screen displayed on the display;

recognize the change from the first case state to the third case state; and perform a second operation among a plurality of operations that are performable when the screen is displayed on the display in the third case state, and wherein more than a preset number of user inputs is receivable when the second operation is performed.

4. The terminal according to claim 1, wherein the control unit is further configured to:

obtain a current time when the display is in the off state;

recognize the change from the first case state to the second case state; and cause the display to display an event window in the second case state, the event window displaying at least one event related to the obtained current time.

5. The terminal according to claim 1, wherein the control unit is further configured to:

determine a previous operation of the terminal performed prior to the first case state when the display is in the off state;

recognize the change from the first case state to the third case state; and perform the determined previous operation in the third case state.

6. The terminal according to claim 1, wherein the control unit is further configured to:

obtain at least usage history of the terminal or an unchecked event of the terminal;

recognize the change from the second case state or the third case state to another case state; and cause the display to display a summary information window in the another case state, the summary information window including the obtained at least usage history or unchecked event of the terminal.

7. The terminal according to claim 1, wherein the control unit is further configured to:

determine an operation of the terminal corresponding to a screen displayed on the display when the display is in the on state;

measure a distance between the case front part and the front portion of the terminal based on the sensed position of the case;

measure a hold time during which the measured distance is maintained, the measured distance being greater than a first distance and less than a second distance; and perform the determined operation corresponding to the hold time.

8. The terminal according to claim 1, wherein:

the sensing unit comprises a proximity sensor for sensing a distance;

the control unit is further configured to measure a distance between the terminal and the case front part of the case based on the sensed distance; and the control unit is further configured to determine the state of the case based on the measured distance.

9. The terminal according to claim 1, wherein:

the sensing unit comprises a magnetic sensor;

the magnetic sensor is configured to sense at least a size of magnetic field or a direction of the magnetic field corresponding to a magnetic material included in the case front part; and the control unit is further configured to determine the state of the case based on the sensed at least size or direction of the magnetic field.

* * * * *